(12) United States Patent
Cumbie

(10) Patent No.: US 12,060,290 B2
(45) Date of Patent: Aug. 13, 2024

(54) ANIMAL HUSBANDRY NUTRIENT AND ODOR MANAGEMENT SYSTEM

(71) Applicant: PANCOPIA, INC, Hampton, VA (US)

(72) Inventor: William E Cumbie, Newport News, VA (US)

(73) Assignee: PANCOPIA, INC, Hampton, VA (US)

( * ) Notice: Subject to any disclaimer, the term of this patent is extended or adjusted under 35 U.S.C. 154(b) by 0 days.

(21) Appl. No.: 17/027,343

(22) Filed: Sep. 21, 2020

(65) Prior Publication Data

US 2021/0087089 A1     Mar. 25, 2021

Related U.S. Application Data

(60) Provisional application No. 62/979,122, filed on Feb. 20, 2020, provisional application No. 62/929,488,
(Continued)

(51) Int. Cl.
*C02F 3/30*     (2023.01)
*A01C 3/02*     (2006.01)
(Continued)

(52) U.S. Cl.
CPC ............ *C02F 3/303* (2013.01); *A01C 3/023* (2013.01); *C02F 1/5281* (2013.01); *C02F 3/006* (2013.01);
(Continued)

(58) Field of Classification Search
None
See application file for complete search history.

(56) References Cited

U.S. PATENT DOCUMENTS 3,205,060 A * 9/1965 Lindert .................... C05G 3/80
    71/64.11
3,223,070 A * 12/1965 Gribble .................... A01K 1/00
    119/14.03
(Continued)

FOREIGN PATENT DOCUMENTS

EP     0220142 A1    9/1986
EP     612704 A1 * 8/1994 ................ C02F 3/34
(Continued)

OTHER PUBLICATIONS

Vanotti, "Nitrifying High-Strength Wastewater," Industrial Wastewater, Sep./Oct. 2000, p. 30-36 (Year: 2000).*
(Continued)

*Primary Examiner* — Chester T Barry
(74) *Attorney, Agent, or Firm* — Kilpatrick Townsend & Stockton LLP

(57) ABSTRACT

A method and system to significantly reduce odor emissions caused by ammonia and other noxious gasses and reduce nitrogen levels in animal husbandry wastewater effectively and efficiently by the use of flush water that has been biochemically conditioned to lower the pH thus reducing the level of un-ionized compounds including $NH_3$ which can volatilize into the atmosphere and which method and system can also be used to remove ammonia and nitrogen from the wastewater system. The present disclosure includes the use of flush water that has been biochemically conditioned to lower its pH thus sequestering non-ionized ammonia from being released from a liquid as ammonia gas. This disclosure relates to the new use of nitrification for biochemical conditioning of wastewater for use as flush water to reduce atmospheric ammonia emissions.

12 Claims, 10 Drawing Sheets

Related U.S. Application Data filed on Nov. 1, 2019, provisional application No. 62/902,999, filed on Sep. 20, 2019.

(51) Int. Cl.

| | |
|---|---|
| *C02F 1/52* | (2023.01) |
| *C02F 3/00* | (2023.01) |
| *C02F 1/00* | (2023.01) |
| *C02F 101/16* | (2006.01) |
| *C02F 103/20* | (2006.01) |

(52) U.S. Cl.
CPC .... *C02F 2001/007* (2013.01); *C02F 2101/16* (2013.01); *C02F 2103/20* (2013.01); *C02F 2209/06* (2013.01); *C02F 2303/02* (2013.01)

(56) References Cited

U.S. PATENT DOCUMENTS

| | | | | |
|---|---|---|---|---|
| 3,620,512 | A * | 11/1971 | Muskat | B01F 33/503 261/92 |
| 6,344,141 | B1 * | 2/2002 | Vandenbergh | C02F 3/34 210/916 |
| 6,398,959 | B1 * | 6/2002 | Teran | A01K 1/0103 210/151 |
| 6,409,788 | B1 * | 6/2002 | Sower | C05F 3/00 71/21 |
| 6,416,652 | B1 * | 7/2002 | Lee | G01N 33/188 205/780.5 |
| 6,698,249 | B1 * | 3/2004 | Yagi | C03B 37/01406 65/414 |
| 6,743,353 | B2 * | 6/2004 | Yamasaki | C02F 3/006 210/151 |
| 6,893,567 | B1 * | 5/2005 | Vanotti | C02F 1/5245 210/906 |
| 6,984,317 | B2 * | 1/2006 | Hiatt | C02F 3/302 210/195.3 |
| 7,194,979 | B2 * | 3/2007 | Moore, Jr. | A01K 1/0047 119/448 |
| 7,481,935 | B2 * | 1/2009 | Olivier | C02F 3/00 210/620 |
| 7,951,296 | B2 | 5/2011 | Williams | |
| 2003/0070986 | A1 * | 4/2003 | Braun | C02F 9/00 210/620 |
| 2004/0040900 | A1 * | 3/2004 | Onali | C02F 3/302 210/150 |
| 2004/0256299 | A1 * | 12/2004 | Herring, Sr. | C02F 9/00 210/167.3 |
| 2006/0060525 | A1 * | 3/2006 | Hoffland | B01D 21/2405 210/603 |
| 2008/0314837 | A1 * | 12/2008 | Vanotti | C02F 3/302 210/705 |
| 2010/0044318 | A1 * | 2/2010 | Stanton | C02F 3/302 210/742 |
| 2010/0184131 | A1 * | 7/2010 | Nicoletti | C05F 17/60 435/286.1 |
| 2010/0282678 | A1 * | 11/2010 | Thurston | C02F 9/00 210/639 |
| 2011/0153213 | A1 * | 6/2011 | Buchanan | B09C 1/105 702/2 |
| 2012/0085702 | A1 * | 4/2012 | Jowett | C02F 3/2806 210/606 |
| 2012/0322131 | A1 * | 12/2012 | Schneider | C12M 21/04 435/167 |
| 2013/0277291 | A1 * | 10/2013 | Hauschild | C02F 3/302 210/151 |
| 2014/0124457 | A1 * | 5/2014 | Hannay | C02F 3/302 210/758 |
| 2014/0206056 | A1 * | 7/2014 | Hazewinkel | C12P 5/023 435/167 |
| 2015/0322399 | A1 * | 11/2015 | Purushothaman | C12M 29/14 435/379 |
| 2016/0067652 | A1 * | 3/2016 | Moore, Jr. | C05F 17/90 435/297.1 |
| 2017/0005349 | A1 * | 1/2017 | Wallace | H01M 8/04208 |
| 2018/0072978 | A1 * | 3/2018 | Satou | C12P 7/08 |
| 2018/0092948 | A1 * | 4/2018 | Weiss | A61K 35/747 |
| 2020/0172419 | A1 * | 6/2020 | Suda | C02F 3/1268 |
| 2020/0299160 | A1 * | 9/2020 | Mussari | C02F 9/00 |
| 2021/0087089 | A1 * | 3/2021 | Cumbie | C02F 1/5281 |

FOREIGN PATENT DOCUMENTS

| | | | | |
|---|---|---|---|---|
| JP | | 49031151 A | * 3/1974 | |
| WO | WO-2012031622 A1 | | * 3/2012 | A01C 3/00 |

OTHER PUBLICATIONS

James et al., Characterizing ammonia emissions from a commercial mechanically ventilated swine finishing facility and an anaerobic waste lagoon in North Carolina, Atmospheric Pollution Research 3 (2012) (Year: 2012).*

Aneja et al., Characterization of atmospheric ammonia emissions from swine waste storage and treatment lagoons, Journal of Geophysical Research, vol. 105, No. D9, pp. 11,535-11,545, May 16, 2000 (Year: 2000).*

Misselbrook et al., Greenhouse Gas and Ammonia Emissions from Slurry Storage: Impacts of Temperature and Potential Mitigation through Covering (Pig Slurry) or Acidification (Cattle Slurry), J. Environ. Qual., Technical Reports: Atmospheric Pollutants and Traci Gases, (2016) (Year: 2016).*

Feng, et al., An overview of the strategies for the deammonification process start-up and recovery after accidental operational failures, Rev. Environ. Sci. Biotechnol., (2017) 16:541-568 (Year: 2017).*

Sommer, et al., Transformation of Organic Matter and the Emissions of Methane and Ammonia During Storage of Liquid Manure as Affected by Acidification, J. Environ. Qual., 46:514-521 (2017) (Year: 2017).*

Yang, "Electrochemical reduction of aqueous nitrogen (N2) at a low overpotential on (110)-oriented Mo nanofilm"), J. Mater. Chem. A, 2017, 5, 18967, DOI: 10.1039/c7ta06139k (Year: 2017).*

Huang, "Air Stripping" Chapter in book, "Handbook of Environmental Engineering, vol. 4: Advanced Physicochemical Treatment Processes," Edited by: L. K. Wang, Y.-T. Hung, and N. K. Shammas © The Humana Press Inc., Totowa, NJ, DOI: 10.1007/978-1-59745-029-4_2 (Year: 2007).*

Garcia-Gonzalez, Recovery of ammonia from swine manure using gas-permeable membranes: Effect of waste strength and pH, Waste Management, 38 (2015) 455-461 (Year: 2015).*

Park, et al., Empirical model of the pH dependence of the maximum specific nitrification rate, Process Biochemistry, 42 (2007) 1671-1676 (Year: 2007).*

Gustin, et al., Effect of pH, temperature and air flow rate on the continuous ammonia stripping of the anaerobic digestion effluent, Process Safety and Environmental Protection, 89 (2011) 61-66 (Year: 2011).*

Colina, Janeth; Lewis, Austin; and Miller, Phillip S., "A Review of the Ammonia Issue and Pork Production" (2000). Nebraska Swine Reports. 108. https://digitalcommons.unl.edu/coopext_swine/108 (Year: 2000).*

Garcia-González et al., Recovery of ammonia from swine manure using gas-permeable membranes: Effect of waste strength and pH, Waste Management, 38 (2015) 455-461 (Year: 2015).*

John Sawyer, "Surface Waters: Ammonium is not Ammonia—Part 1," Iowa State University, https://crops.extension.iastate.edu/cropnews/2008/04/surface-waters-ammonium-not-ammonia---part-1, Apr. 21, 2008, 3p. (Year: 2008).*

Derouchey, J. M., et al. Nutrient composition of Kansas swine lagoons and hoop barn manure. J Anim Sci 2002, 80:2051-2061. http://jas.fass.org/content/80/8/2051.

Hamilton, D. et al. Treatment Lagoons for Animal Agriculture. Animal Agriculture and the Environment: National Center for Manure and Animal Waste Management White Papers. pp. 547-574. 2006. St. Joseph, Michigan: ASABE. Pub. No. 913C0306.

(56) References Cited

OTHER PUBLICATIONS

Magri, A., et al. Evaluation of the SHARON Process (Partial Nitritation in a Chemostat) Using Simulation. Journal of Theoretical and Applied Chemistry. Afinidad (2007), 64 (529), p. 378-383.
Szogi, A. A., et al. Reduction of Ammonia Emissions from Swine Lagoons Using Alternative Wastewater Treatment Technologies. Workshop on Agricultural Air Quality. Wshington, DC. Jun. 5-8, 2006.
Ni, J., et al. Laboratory Evaluation of a Manure Additive for Mitigating Gas and Odor Releases from Layer Hen Manure. Aerosol and Air Quality Research, 17: 2533-2541, 2017.
Zhang, R and Lorimer, J. Pit Recharge Manure Management System. Livestock Industry Facilities & Environment. Iowa State University University Extension. Pm-1601. Reviewed by Harmon, J. Sep. 2008.
Casey, K., et al. PIGBAL Version 1.0. A Nutrient Mass Balance Model for Intensive Piggeries. User and Technical Manual. Department of Primary Industries. Queensland, Australia. Sep. 1996.
U.S. EPA National Center for Environmental Research (NCER) National Nutrient Management Kickoff Workshop. WERF National Center for Resource Recovery and Nutrient Management. Narragansett Bay, RI. Jan. 21 & 22, 2015. pp. 1-34.
North Carolina Department of Environmental Quality. North Carolina Clean Energy Plan Transitioning to a 21st Century Electricity System. Policy & Action Recommendations. Oct. 2019. deq.nc.gov/cleanenergyplan.
Energy and Nutrient Recovery from Swine Manures. Hogs, Pigs, and Pork. Aug. 28, 2019. https://swine.extension.org/energy-and-nutrient-recovery-from-swine-manures/ (accessed Oct. 30, 2019).
Tokhun, N., et al. Piggery Farm Wastewater: Alternative Solution for Agriculture and Soil Fertility. International Journal of Environmental and Rural Development. 2010. 1-2. pp. 58-61.
Hamilton, D. Two Essentials to Control Odors in Buildings: Pull Pits and Keep Hogs Clean. Oklahoma Cooperative Extension Service. No Date.
Szogi, A., et al. Abatement of Ammonia Emissions from Swine Lagoons Using Polymer-Enhanced Solid-Liquid Separation. Applied Engineering in Agriculture vol. 23(6): 837-845. 2007.
Teran, R. et al. Removing Organic Matter and Nutrients from Swine Wastewater after Anaerobic-Aerobic Treatment. Water 2017, 9, 726; doi:10.3390/w9100726.
Vanotti, M., et al. High-Rate Solid-Liquid Separation Coupled With Nitrogen and Phosphorus Treatment of Swine Manure: Effect on Water Quality. Frontiers in Sustainable Food Systems. Aug. 2018, vol. 2, Article 40.
Jones, D., et al. Recirculation Systems for Manure Removal in Hog Confinements. Livestock and Poultry Environmental Learning Community. Originally published as PIH-63. https://lpelc.org/recurculation-systems-for-manure-removal/ (Accessed Aug. 23, 2019). pp. 1-15.
Chastain, J. Chapter 9: Air Quality and Odor Control From Swine Production Facilities. Clemson University. No Date.
Marsh, L, et al. An Evaluation of Alternative Approaches to Reduce Odors from Intensive Swine Operations—Interim Report—Item #428, 1999 Appropriations Act. Virginia Polytechnic Institute. pp. 1-48. No Date.
Sigurdarson, J., et al. The molecular processes of urea hydrolysis in relation to ammonia emissions from agriculture. Rev Environ Sci Biotechnol (2018) 17:241-258. https://doi.org/10.1007/s11157-018-9466-1.
Key, N., et al. Trends and Developments in Hog Manure Management: 1998-2009. EIB-81. USDA Economic Research Service. Sep. 2011.
Mohammes-Nour, A., et al. The Influence of Alkalization and Temperature on Ammonia Recovery from Cow Manure and the Chemical Properties of the Effluents. Sustainability 2019, 11, 2441; doi:10.3390/su11082441.
Hatfield, J., et al. Chapter 4; Swine Manure Management. pp. 78-90. No date. http://citeseerx.ist.psu.edu/viewdoc/summary?doi=10.1.1.456.1736.

Ro, K., Vanotti, M.B., Szogi, A.A., Loughrin, J.H. and Millner P.D. (2018) High-Rate Solid-Liquid Separation Coupled With Nitrogen and Phosphorous Treatment of Swine Manure: Effect on Ammonia Emission. Front. Sustain. Food Syst. (2018) 2:62. doi: 10.3389/fsufs.2018.00062.
Prabhu, M et al. Cow Urine as a potential for struvite production. Int J Recycl Org Waste Agricult (2014) 3:49. DOI: 10.1007/s40093-014-0049-z.
Hjorth, M. et al. Solid-Liquid Separation of Animal Slurry in Theory and Practice. A Review. Agronomy for Sustainable Development. 30 (2010) 153-180EDP Sciences, 2009. DOI: 10.1051/agro/2009010.
Cheng, J, et al. Final Report to Dr. C Mike Williams, Director, NCSU Animal and Poultry Waste Management Center: Ambient Temperature Anaerobic Digester and Greenhouse for Swine Waste Treatment and Bioresource Recovery at Barham Farm. May 2004.
Liu, Y. et al. The roles of Free ammonia (FA) in biological wastewater treatment processes: A Review. Environment International 123 (2019) 10-19.
Cheng, J., et al. Utilization of treated swine wastewater for greenhouse tomato production. Water Science and Technology. vol. 50 No. 2 77-82 (2004).
Lagoon Ammonia Removal: Evaluation of Alternatives. TriplePoint Environmental. www.triplepointwater.com/wastewater-lagoon-solutions/lagoon-ammonia-removal/#.X2UM9dR7mUk (Last accessed Sep. 18, 2020).
FSA Environmental, Queensland. Alternative Systems for Piggery Effluent Treatment. Government of South Australia. Report No. 5492/1, Pig Waste ReportFinal20000407, Jul. 3, 2000.
Smith, J. A Stench That Sickens, and an EPA That Doesn't Care. Dec. 13, 2018. https://earthjustice.org/blog/2017-november/a-stench-that-sickens-and-an-epa-that-doesn-t-care (Accessed Sep. 21, 2019).
Volcke, E., et al. Operation of a SHARON nitritation reactor: practical implications from a theoretical study. Water Science & Technology. vol. 55 No. 6 pp. 145-154. 2007.
Poot, V. et al. Effects of the residual ammonium concentration on NOB repression during partial nitritation with granular sludge. Water Research, 106, pp. 518-560. 2016.
Benefits of Adopting Environmentally Superior Swine Waste Management Technologies in North Carolina: An Environmental and Economic Assessment. Final Report. Nov. 2003. RTI International. RTI Project No. 08252.000.
Du, X. et al. Dissolved Oxygen Control in Activated Sludge Process Using a Neural Network-Based Adaptive PID Algorithm. Appl. Sci. 2018, 8, 261; doi:10.3390/app8020261.
Animal Manure Management. RCA Issue Brief #Dec. 7, 1995. Natural Resources Conservation Service. https://www.nrcs.usda.gov/wps/portal/nrcs/detail/national/technical/nra/rca/?cid=nrcs143_014211 (accessed Sep. 11, 2020).
Miller, D.10 Steps to Manage Odor. National Hog Farmer. 2007. https://www.nationalhogfarmer.com/mag/10_steps_manage_odor (accessed Jun. 11, 2020).
Kunapongkiti, P., et al. Application of cell immobilization technology to promote nitritation: A review. Environmental Engineering Research. 2020. http://eeer.org/journal/view.php?doi=10.4491/eer.2019.151.
Aneja, V. et al. Characterizing Ammonia Emissions from Swine Farms in Eastern North Carolina: Part 1—Conventional Lagoon and Spray Technology for Waste Treatment. Journal of the Air & Waste Management Association, 58:9, 1130-1144, DOI: 10.3155/1047-3289.58.9.1130.
Comammox. https://en.wikipedia.org/wiki/Comammox (last accessed Sep. 20, 2020; page last edited Sep. 3, 2020).
Chastain, J. and Henry, S. Clemson Swine Manual. Chapter 4—Management of Lagoons and Storage Structures for Swine Manure. p. 4-1 to 4-31.
Buchanan, E., et al. Commercial Swine Barn Baseline Energy Audit. University of Minnesota. Jun. 30, 2017.
Rudek, Joseph. Adverse Health Effects Of Hog Production: A Literature Review. Environmental Defense Fund. 2008.
Boda, J.O., Overland Flow Treatment of Swine Lagoon Effluent. Thesis, Oregon State University. Sep. 2, 1975.

(56) References Cited

OTHER PUBLICATIONS

Heber, A. et al. Controlling Ammonia Gas In Swine Buildings. Indoor Air Quality. Purdue University Cooperative Extension Service. 1996.

Moser, M. et al. Benefits, Costs and Operating Experience at Seven New Agricutural Anaerobic Digesters. EPA. https://www.epa.gov/sites/production/files/2014-12/documents/lib-ben.pdf.

Fulhage, C. Crystallization in Lagoon Effluent Recycle Lines. Extension University of Missouri. 2019. https://extension2.missouri.edu/eq353.

Strobel, B., et al. Daily Cleaning Options for Sloped Manure Pits in Swine Finishing. Agricultural and Biosystems Engineering. Conference Proceedings and Presentations. Iowa State University, Digital Repository. Jun. 2009.

Vanotti, M. et al. Development of a second-generation environmentally superior technology for treatment of swine manure in the USA. Bioresource Technology, vol. 100, Issue 22. Nov. 2009. p. 5406-5416. (Abstract).

Controlling Odors from Swine Operations. Pork Information Gateway. Published Apr. 17, 2012. porkgateway.org/resource/controlling-odors-from-swine-operations/ (accessed Jun. 31, 2020).

Design Criteria for Swine Waste Treatment Systems. Environmental Protection Technology Series. EPA-600/2-76-233. Oct. 1976.

Heber, J. et al. Effect of a Manure Additive On Ammonia Emission From Swine Finishing Buildings. American Society of Agricultural Engineers. vol. 43(6), p. 1895-1902. 2000.

Kim, M., e tal. Effects of pH, molar ratios and pre-treatment on phosphorus recovery through struvite crystallization from effluent of anaerobically digested swine wastewater. Environmental Engineering Research. 2016. http://dx.doi.org/10.4491/eer.2016.037.

Fryberger, C. Waste Not, Want Not: Financing Swine Biogas Projects in Eastern North Carolina. Department of City and Regional Planning. UNC Chapel Hill. 2014.

Barnes, G. Environmental groups say Smithfield's plans to cover hog lagoons and add digesters don't solve contamination and health problems caused by large-scale farms in Eastern North Carolina. https://www.northcarolinahealthnews.org/author/gregbarnes/ Jan. 10, 2019.

Shukla, S. Evaluation of Odor-Reducing Commercial Products for Animal Waste. Thesis, Biological Systems Engineering. Virginia Polytechnic Institute and State University. 1997.

Florida Department of Environmental Protection Chemistry Laboratory Methods Manual, Tallahassee. Calculation of Un-Ionized Ammonia in Fresh Wataer. STORET Parameter Code 00619. Feb. 12, 2001, Revision 2.

Harmon, J. Field Performance Evaluation of a Ventilation System: A Swine Case Study. Agricultural and Biosystems Engineering. Conference Proceedings and Presentations. Iowa State University, Digital Repository. 2012.

Facing the Facts About Hogs An In-Depth Report on North Carolina's Hog Industry. Alliance for Responsible Swine Industry and North Carolina Coastal Federation. Sep. 1988.

US EPA. Voluntary Estuary Monitoring Manual, A Methods Manual. Chapter 11: pH and Alkalinity. Second Edition. EPS-842-B-06-003. Mar. 2006.

US EPA. Nitrification. Office of Water (4601M), Office of Ground Water and Drinking Water, Distribution System Issue Paper. Aug. 15, 2002. http://www.epa.gov/safewater/disinfection/tcr/regulation_revisions.html.

Williams, M. Future of Manure Management in North Carolina. Fiftieth Annual North Carolina Pork Conference. Feb. 15-16, 2006.

Aneja, V. et al., "Measurement and Modelling of Ammonia Emissions at Waste Treatment Lagoon—Atmospheric Interface," Water, Air, and Soil Pollution: Focus 1:177-188 (2001).

\* cited by examiner

ANIMAL HUSBANDRY NUTRIENT AND ODOR MANAGEMENT SYSTEM

CROSS-REFERENCE TO RELATED APPLICATIONS

This is a non-provisional application that claims priority under 35 USC 119 from U.S. Provisional Application No. 62/979,122 entitled "Animal Husbandry Nutrient and odor management System" filed Feb. 20, 2020.

This application also claims priority under 35 USC 119 from U.S. Provisional Application No. 62/929,488 entitled "Animal Husbandry Struvite Control System" filed Nov. 1, 2019.

This application also claims priority under 35 USC 119 from U.S. Provisional Application No. 62/902,999 entitled "Nutrient Management System" filed Sep. 20, 2019.

All applications are hereby incorporated by reference in their entirety.

GOVERNMENT LICENSE RIGHTS

This invention was made with government support under USDA Phase 1 SBIR 2018-33610-28501 awarded by the United States Department of Agriculture. The government has certain rights in the invention.

BACKGROUND

The present disclosure includes a method and system to significantly reduce odor emissions caused by ammonia and other noxious gasses and reduce nitrogen levels in animal husbandry wastewater effectively and efficiently by the use of flush water (the term flush water also refers to water used to recharge a pit after flushing) that has been biochemically conditioned to lower the pH thus reducing the level of un-ionized compounds including $NH_3$ which can volatilize into the atmosphere and which method and system can also be used to remove ammonia and nitrogen from the wastewater system.

Description of the Problem

Nutrient and odor management is an important and often unsolved issue within the animal husbandry industry. Ammonia and odor emanations from barns, lagoons, spray irrigation, and other farm systems can cause problems for those living in surrounding neighborhoods as well as negatively affecting animal yields (including increased mortality and reduced weight gain). Additionally, excessively high nutrient levels can make beneficial reuse of the nutrients more difficult. While nitrogen can serve as a fertilizer, for example, more than a specified limit of it in reused wastewater can limit the amount that can be applied for irrigation purposes. Similarly, high nutrient levels can cause beneficial reuse via methane generation (or other biofuels) more difficult because the waste stream from these activities is often much more odorous and difficult to dispose of due to its high nitrogen content.

Large scale animal husbandry creates large amounts of manure that have significant levels of nitrogen. As these high levels of nitrogen can create problems including odors from ammonia emissions as well as liquid and solids application limitations, an affordable and effective method to manage nitrogen in these situations is desirable and would be a great boon to the industry.

Adverse environmental impacts caused North Carolina to institute a moratorium on increased swine production in 1997 that was estimated to cost the state more than $100 million per year in 1998 While the moratorium was lifted in 2007, swine farmers could not construct new anaerobic lagoons due to environmental and health concerns. However, the moratorium did not address existing anaerobic lagoons which make up a significant fraction of the more than 3,000 swine lagoons in the state which remain environmental and health concerns.

This explosive increase in swine production has generated 10 billion gallons of wet animal waste as wastewater per year which has had a significant adverse impact not only on the environment, but also on human health. In North Carolina alone, the impact on human health is estimated to be in excess of $300 million. The Environmental Defense Fund noted that ammonia emissions from hog farms create serious health problems and are the most significant public health threat from animal feeding operations on a regional scale High levels of ammonia emissions have been a primary target for lawsuits, particularly in North Carolina where one study has linked them to $300M in health (mainly respiratory issues) in surrounding neighborhoods to nearby the farms. The problem associated with these odors has resulted in 30 major lawsuits in North Carolina alone, the first five cases being won by the plaintiffs with combined awards of over $500 million.

As biogas projects based on animal manure become a large-scale reality, unintended consequences arise from ammonia laden wastewater used as a feedstock. While carbon capture and conversion to biogas is maximized in covered lagoons, covering of lagoons doubles ammonia emissions in barns, damages swine health and productivity, and increases nuisance ammonia emissions that reach surrounding neighborhoods.

In 2019, Dominion Energy and Smithfield Foods announced a $500 million joint venture to cover swine lagoons and produce biogas, creating the nation's largest supplier of renewable natural gas. The project encompasses the covering of hundreds of swine lagoons, hundreds of miles of piping, and gas purification and injection—all within a decade! North Carolina is in the forefront of clean energy and has recently released its Clean Energy Plan with ambitious milestones to increase clean energy technologies and reduce greenhouse emissions from power generators by 70% by 2030, achieving carbon neutrality by 2050. The state ranks third in biogas potential due to the large number of swine and poultry (respectively ranking $2^{nd}$ and $3^{rd}$ nationally). However, generation of biogas from swine may be in jeopardy as "stakeholders have expressed concerns over air and water pollution from swine operations' use of biogas technology that relies on lagoons and spray field waste management systems. Pollution to waterways, odors, and public health concerns for nearby and downstream communities, including the disproportionate effect by minority populations, are the major causes for opposition to biogas production." From these concerns, one workshop recommended that swine biogas not be considered a 'clean' technology.

Development of large-scale biogas recovery using organic material in swine lagoons presents an opportunity for farmers to monetize their disposal of waste and develop diverse additional income streams that may not fluctuate as much as the commodity prices for pork. Addressing the ammonia removal issue in swine wastewater will help ensure these projects move forward unimpeded by concerns regarding the detrimental effects of excess ammonia on people, the environment, and swine.

Covering of swine lagoons to produce biogas will prevent ammonia from outgassing from the lagoons, but it will not eliminate ammonia outgassing (which accounts for 25% of ammonia removal). It will simply move outgassing to other locations, including animal barns and spray irrigation. Even worse, covering of the lagoons will also prevent ammonia reduction to nitrogen gas since the anaerobic process that generates biogas prevents another 25% of the nitrogen from being removed by nitrification/denitrification (N/D) in uncovered lagoons. Thus, the overall ammonia levels of lagoon effluent will increase in the range of 50% unless this issue is addressed. Increasing ammonia levels by 50% in the effluent of these lagoons will result in a commensurate increase in ammonia emissions in swine barns as the effluent is used as flush water and effluent used for spray irrigation (the two major uses of lagoon effluent).

North Carolina has invested $17 million in research over the past two decades seeking to develop systems to remove ammonia odors from swine operations. Seventeen technologies were formally evaluated and shown to be capable of successfully addressing ammonia odors in swine operations. However, all options were cost prohibitive based on the financial baseline set for the evaluation. The technology is simply too expensive to install and operate, and the razor-thin profit margins on swine production preclude larger outlays.

Odor capping is an alternative to full treatment that can be used to reduce emissions from lagoons. With regard to odor capping systems for swine lagoons, one readily available form of treatment is chemical and/or biologics addition. In 2001, USDA and the Agricultural Research Service National Swine Research and Information Center conducted an extensive survey of 35 additives marketed to prevent odor emissions from lagoons. Only 8 of the 35 additives were shown to decrease ammonia emissions, and the average ammonia reduction of these eight additives was 7%. The most effective additive reduced of ammonia emissions by 15%.

There remains an immediate need to provide a comprehensive system to manage nutrients, particularly nitrogen, and to control odors within the animal husbandry system. Most previous research has focused on removing most of the ammonia from the waste system after it is flushed from the barns and before it enters a storage lagoon as ammonia is the compound associated with the majority of odors. By removing almost all of the ammonia, the nitrogen content of the wastewater is also significantly reduced. However, removal of ammonia as it exits the barns requires additional unit processes such as solids removal (by digestion and/or dewatering) or covered lagoon operation (to prevent ammonia emissions and/or lower the amount of nitrogen). There have been some attempts at overall management of nitrogen, but they generally are expensive—both in terms of energy and manpower—and fall short of the goal of full nutrient and odor management. Additionally, removal of all ammonia is costly not only in terms of capital costs of structures and equipment but also in terms of operational costs including larger compressed air requirements, energy, and operations.

The present disclosure describes a nutrient and odor management system (NOMS) that can be used for animal husbandry and other similar systems (such as municipal wastewater treatment). Innovative components of the system include overall nutrient and odor management (considers the entirety of an animal husbandry system instead of a unit by unit approach based on controlling individual aspects one at a time. In addition providing emphasis on lowering energy consumption and reducing maintenance systems as well as an ability to culture organisms to beneficially replenish the animal husbandry ecosystem are all desired features. It is important to maintain flexibility so that various configurations and specific processes can be provided that are tailored to meet specific site needs. The NOMS of the present disclosure can be used to remove a targeted amount of nutrients from a process stream and to condition the process stream to prevent the release of nuisance levels of ammonia. Importantly, the system does not require the removal of almost all ammonia to prevent off gassing of ammonia but instead utilizes implementation of nitrification to biologically lower the pH of flush water, thus shifting free ammonia (i.e. un-ionized, $NH_3$) to its ionized state, ammonium ($NH_4^+$). This technique ensures that ammonia cannot escape as a gas.

For the present disclosure, the term "swine husbandry operations" involve barns, collection in pits/troughs that are used for temporary storage, lagoons, and a flushing system that uses some of the lagoon effluent to flush out the troughs and/or pits that are used to temporarily accumulate animal waste in barns. In this disclosure the term "flush water" refers to both water that is flushed through the system to remove animal waste and also refers to water used to recharge a pit after the pit has been flushed, i.e., recharge water. This type of system is referred to hereafter as BPLFD (barns, pits, lagoons, flushing, and discharge) waste systems. Though the following discussion focuses on swine, the waste systems described herein, and associated modifications can be used for other animals. The components of a BPLFD system are as follows:

1. B (Barns) or (shelters); Structures that house animals and the associated waste (manure and urine) produced in barns or other structures
2. P (Pits) and/or troughs. Waste temporarily collected in troughs and/or pits. Barns with troughs periodically (often several time a day) flush fluid to transport wastes from the barns to the troughs and then to a lagoon. Barns with Pits have a large pit filled with fluid that the animals defecate into. When the fluid has received a large amount of waste, it is emptied by pulling a plug (hence sometimes called a pull-plug system) which sluices the waste to the lagoon. The plug is then replaced and the pit refilled with recharge wastewater which is also termed flush water in this disclosure. This offers low-cost temporary storage before flushing into lagoons.
3. L (Lagoon). Waste transferred to longer term storage, typically a lagoon, and/or receiving partial treatment. Alternatives include anaerobic digesters and/or mechanical dewatering and treatment systems. This component usually incorporates some degree of solid/liquid separation, whether slow rate settling in a lagoon or high-rate separation in a mechanical dewatering process, or some combination of approaches and remove at least 40% of the settleable organic carbon present in wastewater flushed from barns. In general, approximately 25 to 40% of particulate organic carbon as measured by biochemical oxygen demand will settle from wastewater in less than one day and lagoon may reach up to 95% organic carbon removal if detention time and dissolved oxygen is sufficient.
4. F (Flush water). Liquid is typically recovered from the lagoon where some solids separation has occurred, and separated liquid can be reused as flush water to rinse out the pits (P) or troughs.

Flushing can be accomplished by pumping directly to the pits/troughs with a larger capacity pump, or more economically by pumping slowly from the lagoon to a flush tank, and then discharging flushing volumes from the tank at intervals as needed.

Flushing can also be accomplished by filling a cesspit under the barn (B) with a fluid (currently the most frequently used fluid is swine lagoon effluent that is high in ammonia) which then receives swine waste, generally over a period of 5 to 14 days and when the level of waste is judged by experienced farmers to become too much, a plug is pulled and the wastewater and waste solids are sluiced to a lagoon for storage and partial treatment. The plug is then replaced, and the pit once again filled with lagoon effluent once again.

A subset of flushing includes the use of lower flows to remove liquid waste while retaining substantially most of the solid waste. Removal using lower flows permits liquid waste that is lower in organic solids to be removed. This can be used to treat this flow separately. It can also remove urea and ammonia that is typically in high concentration in the liquid portion, thus keeping the waste in the pits and troughs from becoming an anaerobic and slower the release of gaseous ammonia. Wastewater that has been conditioned to include oxygen, whether as dissolved oxygen or as combined as a compound such as nitrite or nitrate, can retard the onset of anaerobic conditions. Anaerobic conditions produce a reducing environment and can release noxious substances such as hydrogen sulfide (H2S0 which produces what is sometimes referred to as 'the rotten egg smell.' Because of this a that has significant nitrite and nitrate levels, such as 25 mg/l or more, can be termed 'freshening' or 'sweetening water' (SW). Sweetening Water (SW) or freshening water is not commonly used in animal husbandry and is part of the disclosure claimed herein.

5. D (Discharge)—treated wastewater (WW) is discharged from the lagoon storage. A portion of the discharged wastewater can be used as F for cleaning the B and flushing the P. The discharge can also be used for sweetening, SW, of pits and troughs. Typically, any additional wastewater from the lagoon above what is needed to flushing and internal reuse is used for irrigation of crops.

For a large number of husbandry operations, a flushing system is necessary to transport waste from pits (or troughs) to a lagoon. The common source of flushing water (also termed recharge water for pits that are flushed and then recharged with flush water) is the effluent from the lagoon where solids are sluiced to. Sometimes the source is a secondary lagoon or other downstream bodies of water. The advantage of this source of water is that it is readily available and inexpensive. However, the disadvantage is that this source for flush water is high in organic carbon and nitrogen, which exacerbates the problem of ammonia emissions from the waste and adds to the loading on the downstream lagoon(s) and processes. Flushing with potable water would add considerable costs and it would do little to freshen wastes in the pits. It would also add a considerable quantity of additional water that would require expensive treatment before it could be released to an adjacent water body. Therefore, an odor problem would remain as well as the added loading to the lagoon and downstream processes. Ideally, the flush water should beneficially improve the condition of the husbandry operation.

The present disclosure includes the use of flush water that has been biochemically conditioned to lower its pH thus sequestering non-ionized ammonia from being released from a liquid as ammonia gas. This disclosure relates to the new use of nitrification for biochemical conditioning of wastewater for use as flush water to reduce atmospheric ammonia emissions. Application of wastewater containing high levels of ammonia of 50 mg/l or more that has its pH lowered has been discovered to significantly suppress ammonia emissions. Release of ammonia existing in its liquid state in wastewater to form a gaseous emission, can be reduced by 50% or more by lowering the pH of the liquid by 0.3 pH units and by 90% if pH is lowered 1 unit. This treatment can also be used to reduce ammonia emissions and other odors and the overall levels of ammonia and nitrogen in a wastewater system in combination with other biological processes, including denitrification and deammonification. Production of compounds containing oxygen including nitrite and nitrate can also sequester emanation of other odors and the onset of anaerobic conditions and associated problems. It is important to note that a source of oxygen for other oxidative processes can delay the onset of a reducing environment thus reducing the emissions of other odorous compounds such as hydrogen sulfide.

Another embodiment of the present disclosure involves the addition of an NOMS process to the BPLFD system. The NOMS process unit utilizes the effluent from the lagoon with lower solids content and reduced organic strength as influent to the first portion of the NOMS unit which is a nitrification system. The nitrification system aerates the liquid and converts ammonia to nitrite and nitrate, resulting in a reduction of the pH. This nitrified water is then used to flush the pits and troughs in a barn. The treated water freshens the liquid in the pits/troughs and provides nitrite and nitrate substrates for denitrifying and provides anammox (anaerobic ammonium oxidation) organisms in the pits and troughs, therefore promoting carbon and ammonia removal in the pits/troughs themselves. The lower pH flush water will decrease ammonia gas emissions within the barn by ionization of ammonia to ammonium which will not volatilize. It also will reduce urea hydrolysis, contributing to improved air quality and animal health in the barns. Additionally, the excess nitrifying biomass produced in the nitrifying system can be used to seed bacteria within the lagoon and other locations to enhance nitrification in these locations.

The term 'freshen' as used here refers to the activity of a substance which reduces anaerobic conditions and also can refer to adding oxygen containing compounds including free oxygen and combined oxygen to form nitrites and nitrates. It may also refer to additional qualities that reduce the noxiousness of water such as lowering the pH of a liquid to keep free ammonia from coming out of solution as a gas. It should be noted that the present disclosure provides the ability to also add oxygen to wastewater to oxidize other noxious compounds such as hydrogen sulfide and mercaptans found to be additional sources of odor problems.

The NOMS unit(s) can serve the entire farm (or similar area) with multiple barns to flush or if desired multiple units can be installed to service individual barns (or just a few barns). This may permit customization to better serve the needs of different types of barns such as those with pits instead of troughs. Additionally, the nitrification component of the system may be configured to produce nitrites over nitrates to reduce energy costs and promote deammonification over denitrification in the pits.

SUMMARY OF THE INVENTION

The present disclosure provides two distinct and major benefits as well as additional benefits. Two major features include:
1) Biochemical conditioning of wastewater to lower its pH and thus lower the level of ammonia gas that volatilizes from the wastewater.
2) Reduction of nitrogen in the wastewater system due to subsequent denitrification and deammonification in this process and in downstream processes that can be tailored to achieve a targeted level of removal.

This innovation is termed a nutrient and odor management system (NOMS) which is implemented as a unit (or units) that condition wastewater from the effluent of a lagoon or other similar wastewater sources. This disclosure includes the use of the addition of oxygen and the culturing of nitrifying organisms to nitrify the ammonia in the wastewater thus biochemically depressing its pH and providing a source of nitrite, nitrate, and oxygen to downstream processes. This system transforms typical flush water's liability of high levels of ammonia and nitrogen into a benefit that can be used to improve the condition of barns, pits, lagoons, and other downstream processes. This system considers the entire husbandry waste operation in totality and makes use of existing tankage and processes.

Advantages of this system include:
1) Suppression of ammonia of gassing by biochemically lowering the pH of flush water. Lowering the pH of the wastewater can be accomplished by a number of means including the novel use of biochemically mediated pH depression including nitrification of a wastewater containing ammonia to covert the ammonia to nitrite and nitrate which produces two hydrogen ions and consumes alkalinity as part of the bacteria's nitrifying process and results in the lowering of the pH of the wastewater.
2) Use of existing waste system components such as pits and troughs as part of the treatment process which minimizes the need for additional equipment to remove nutrients such as nitrogen and simplifies the process by eliminating the addition of a more complicated processes such as denitrification. This significantly reduces capital and operating costs and also permits faster implementation.
3) Nitrifying the swine wastewater feedstock at a different location than any known ammonia removal or transformation processes, such as at the lagoon effluent or other locations where there is indication of preliminary settling of solids. This relocation significantly decreases power requirements for nitrification by using wastewater that is lower in organic carbon than raw wastewater (i.e. wastewater that has not been treated or conditioned) flushed from pits and troughs and more effectively decreases the pH of the wastewater to permit it to suppress ammonia emissions. It also permits the conversion of only the fraction of ammonia necessary to lower the pH to its target level thus lowering sizing of the nitrifying system, significantly lowering energy costs, and permitting the retention of an appropriate amount of ammonia for other uses.
4) Control of the nitrifying process to enhance the ability to suppress ammonia emissions, assist in the removal of organic carbon (by denitrification), and promote removal of additional nitrogen without the need for additional organic carbon (by deammonification). The nitrification process can be controlled to prioritize the formation of nitrites over nitrates by maintaining bioreactor conditions that favor the growth of Ammonia Oxidizing Bacteria (AOBs) over Nitrite Oxidizing Bacteria (NOBs). The smaller tankage required makes it possible to more economically heat the process to keep it performing well during cold weather periods and also permits implementation of accelerating the growth of AOBs over NOBs which in turn can promote additional nitrogen removal through deammonification.
5) Recycling conditioned water through existing structures such as barns for additional treatment and to suppress odors, remove nitrogen, and improve swine productivity. Recycling the highly nitrified, low pH wastewater suppresses ammonia emissions and permits denitrification to occur naturally, thus removing a significant amount of nitrogen without the need for added tankage or process control. If the process is tuned to produce significant nitrite, and anammox bacteria are present (either naturally or by seeding the system), additional nitrogen can be removed (more than denitrification can) by deammonification, which uses both nitrite and ammonia to produce nitrogen gas.
6) Ability to control the amount of nitrogen removed Wastewater generated from swine production and other animal husbandry activities can be used for irrigation of crops. These crops can benefit from the addition of nitrogen contained in wastewater, however, often there is an excess of nitrogen for crops and this is detrimental. Implementing a nitrification system as a treatment for flush water permits the operator to nitrify as specific amount of nitrogen which then will be removed in the pits and lagoons through denitrification and deammonification. Since the nitrification system is being used to lower pH and all of the ammonia does not need to be nitrified it is possible to nitrify only the amount necessary for pH suppression and also for any additional nitrogen removal desired in the pits and lagoons. Thus, a targeted amount of nitrogen may remain in the system at a level that can be used beneficially for irrigation. For example, it may be necessary to nitrify only 30% of the ammonia in a wastewater to condition it for flushing. However, it may be desirable to increase this level to 60% removal of ammonia or more in order to lower the amount of ammonia that is recycled and thus lower the overall level of nitrogen in the wastewater in all locations including the pits and lagoon.
7) Fluid treated using the NOMS may be used for other purposes including use as flush water in waste piping to prevent the buildup of precipitates such as struvite. The treated fluid can also be used to extract additional nutrients including phosphorus.

Solution to Problem

Most approaches to resolving the problem of excess nitrogen and ammonia in lagoon wastewater focus on removing the nitrogen as it exits the barns and before it enters the lagoons. This approach removes ammonia and other nitrogen species but also requires additional equipment and energy to remove organic carbon which is preferentially removed if present. The added energy expenditure and other operation costs associated with the removal of organic carbon increases treatment costs of raw swine wastewater by a factor of three to ten times or more compared to removing nitrogen from raw wastewater flushed from pits and troughs that has not been treated or conditioned.

Moving the withdrawal point to the end of the lagoon (or after some solids removal has taken place) lowers the organic carbon by at least 25 to 40% which will in turn lower the oxygen demand of the wastewater making more oxygen available to enhance nitrification. Additionally, the normally slow biological process of the lagoon also lowers the alkalinity of the effluent thus making it much easier to depress the pH by nitrification. Selection of a point of withdrawal that minimizes organic carbon and alkalinity levels to enhance the ability of nitrification to lower the pH is a major innovative part of the nutrient and odor management system (NOMS). In the past, enough attention has not been given to the benefit of using source water that has a lower alkalinity to ammonia ratio. Use of this source water changes the ability to depress the pH in a significant and heretofore unrecognized manner. When high alkalinity water is used to nitrify and then reused as wash water, some benefits will accrue but not as much as when a low alkalinity source water is used. Also it is important to note that full nitrification of most of the ammonia in the wastewater is not necessary for effective odor control. Sufficiently nitrifying to lower the pH to the target level requires much less volumetric space and energy, thus significantly lowering capital and operating costs.

A second related additional feature of one embodiment of the NOMS is that the system can be used to culture and seed nitrifiers for other parts of the process. Thus, nitrifiers can be introduced to the troughs and pits where they can scavenge oxygen from surface interfaces (including air/water and slime/air and other interfaces) that increases overall nitrification and nitrogen removal in the system. Similarly, nitrifiers can be seeded into the lagoon where they can utilize the large air/water interface to obtain oxygen and significantly enhance nitrification. Dispersal systems can be installed to seed nitrifiers to the top layer of the lagoon and greatly increase nitrification. Nitrification in the lagoon will also lower the pH, slow the speed of hydrolysis of the urine, and lower ammonia emanations.

The nitrification process can also be configured to increase the production of nitrites over nitrates. This is performed by a number of methods that favor increasing the levels of AOBs (define here or above not sure may have already) over NOBs including raising the temperature of the process, maintaining a lower dissolved oxygen level, and reducing the hydraulic and solids retention time to wash out slower growing NOBs. Production of nitrites over nitrates makes this process efficient for oxygen use thus minimizing energy costs. Additionally, nitrites can be used by anammox bacteria in the deammonification process that employs approximately one-part ammonia for each part of nitrite and which requires no organic carbon. Thus, additional nitrogen can be removed (one-part ammonia for each part nitrite produced) and organic carbon can be preserved for other beneficial uses, including the production of biogas.

Biological pH control is achieved by a combination process that involves simultaneous nitrification and denitrification, or nitrification and anammox or a combination of the three sets of organisms, namely nitrifiers, denitrifiers, and anammox.

Most approaches to resolving the problem of excess nitrogen and ammonia in lagoon wastewater focus on removing the nitrogen as it exits the barns and before it enters the lagoons. This approach removes nitrogen and ammonia but also requires additional equipment and energy to remove high levels of organic carbon, much of which is in the form of settleable solids.

This present disclosure and associated system provides many financial and environmental advantages regarding swine and other animal waste processes The system also permits the expansion of biogas generation from animal manure because the installation of the NOMS permits the covering of lagoons without raising the ammonia levels in barns and offsite thus improving both swine productivity and improving the health of persons living within close proximity to husbandry operations.

Accordingly, this system provides

Significantly reduced or elimination of odor causing gaseous emanations, including mercaptans and hydrogen sulfide in barns, from different parts of the waste system including:
  Swine pits and troughs, where lowering the pH will suppress gas emanations and slower hydrolysis of urea
  For waste lagoons, there the lowering pH will suppress gas emanations and slow hydrolysis of urea along with significantly lowering gaseous ammonia levels
  With respect to irrigation, lowering pH will suppress gas emanations and slow the hydrolysis process that creates urea along with significantly lower gaseous ammonia levels.

Improves living conditions of the farmed animals. This therefore permits expansion of the number of animals housed due to improved living conditions.

Lowered corrosion due to lowering ammonia and other corrosive gas concentrations thereby increasing equipment service life Saving energy by lowering ventilation requirements due to improvement of the atmosphere in barns. This can reduce the power required for ventilation and can also reduce heating costs in cold environments due to lower ventilation needs.
  A study from the University of Minnesota found energy use per swine in weaning operations of is approximately 12 KWH per swine. Approximately 66% of the power is for ventilation and heating (8 KWH per swine). For 2.5× turnover per year and 4,000 swine, the energy use per year for ventilation and heating would be 80,000 KWH, or 220 KW per day, or 9 KW per hour. If ventilation and heating costs are reduced by 50% the facility would recover 4.5 KW per hour, enough to power an air blower and associated equipment drawing 6 hp which is sufficient to install an NOMS for the facility. Thus a NOMS system may be energy neutral and add little to the cost of swine operations while providing significant benefits A significant benefit of the NOMS unit is that it is capable of insertion of oxygen at strategic locations. The total amount and/or concentration of oxygen needed does not need to be added at that one location. Oxygen from the aerobic layer of the lagoon can also lead to the proper and needed nitrification when appropriate organisms are seeded into the lagoon (perhaps even by spray over the surface from time to time). Anaerobic processes can also operate to reduce organic matter thus lowering oxygen requirements even further.

NOMS can be used in conjunction with anaerobic degradation of organic carbon for production of biogas. Covering of lagoons to extract methane is compatible with the system and works well. The oxygen must be added to a location where it would not be wasted on degrading organic carbon (and the organic carbon could then be used to generate methane). In addition, small amounts or no free oxygen should be added to the lagoons thus permitting anaerobic processes to operate efficiently and also to prevent explosion hazards due to abnormally high levels of oxygen in the biogas.

Nitrification is a simple system to control compared to some other processes such as nitrification/denitrification or deammonification. It can be further simplified by controlling organic carbon fluctuations (which cause varying oxygen demand) because taking recycle flush water from the lagoon will dampen fluctuations. In addition, the system can be even further simplified by using attached growth media which will help control washout of organisms and also permit a greater density of organisms.

The system can culture beneficial organisms for release to other parts of the system that can use them
  High nitrite wastewater (over 50 mg/l) can be blended with high ammonia wastewater to culture anammox for later reseeding. This approach is extremely beneficial if the nitrite levels approach or exceed the ammonia levels since anammox bacteria use nitrite and ammonia on a 1:1 basis for the metabolism.

Takes water after some organic carbon and nitrogen has been removed, thus requiring as little as one-tenth the oxygen input to nitrify wastewater compared with raw wastewater. The nitrified wastewater can be conditioned as noted in this disclosure and routed to use as flush water, to be used to sweeten troughs/pits, and/or sent directly to the lagoon for seeding of nitrifiers (might also want to spray apply it).

Using all the storage of the system (particularly the lagoon) makes it easier to balance air and other requirements because the characteristics of the recycle water are more consistent due to mixing in the lagoon which is often sized to hold six months to several years of flow.

The system works optimally within ambient outdoor temperature ranges (usually between 40 and 100 degrees Fahrenheit), however, during the winter the system will not nitrify as much, but odor is not as much an issue at that time of the year. In the summer, the warmer temperatures will permit the nitrifiers to perform much more efficiently.

The process is extremely energy efficient because it only requires nitrification to the extent necessary to depress the pH of the wastewater and keep substantial ammonia gas from escaping Optimizes the husbandry system.

Will reduce volatilization of ammonia by converting it to nitrites and nitrates and by lowering the pH which keeps ammonia from coming out of solution.

Though the nitrified water may later be denitrified (or deammoniated) after the nitrifying system, the lower pH will be present in the flush water and should significantly reduce ammonia gas emissions from the barns.

A process can be added to remove phosphorus but as long as P is not a limiting nutrient it is best to keep it in the water for irrigation as a nutrient supplement.

Can be very quickly implemented. The smaller size of the units required for NOMS permit prefabrication and deployment by truck. The NOMS can also be pre-seeded with organisms permitting the system to be installed and achieve target operation in as little as 1 to 2 weeks. This compares with an estimated 4 to 8 months to install an equivalent system to remove nitrogen from raw wastewater (i.e. wastewater that has not been treated or conditioned).

Complement covering of lagoons to extract methane—could still cover the lagoon because most of the organics would still be cycled back into the lagoon and could be extracted as biogas.

Another feature is that the system may be turned up to maximum nitrification in the time period leading up to spray irrigation from the lagoon to enhance nitrification and lower both nitrogen levels and odors that might arise during spray irrigation.

It is also possible to modify an existing flushing tank to serve as a nitrification reactor. The modified flushing tank can be operated as a sequencing batch reactor and the fluid at the top portion can be used as flushing water once most of the solids have been settled.

Use of low pH, nitrified flushing water with a pH of 7.7 or lower and preferentially to a pH of 7.3 or lower will eliminate the need for additives to remove odors. The average swine lagoon effluent has a pH of 8 which and can vary plus or minus 0.3 units.

The present disclosure would also serve the poultry farm systems because ammonia concentrations are often higher than for swine production.

Current flush systems use approximately a 1:1 to 1:2 ratio of flush water to waste generated to ensure that there is enough flushing and scouring action to move solids to the lagoon. Most of the ammonia generated from swine waste comes from urine not feces Urine releases more than 100 times the ammonia concentrations (400 µg/l NH3) vs. feces (3.2 µg/l NH3) at 30° C. A NOMS could be used to flush a small amount of treated water through the system such as 5-10% needed for a complete flush to remove the urine from the waste and segregate it for separate treatment. Such collected waste would be relatively low in organic carbon and high in nitrogen and could be used as a concentrated fertilizer.

Low pH, nitrified water can be used for washdown and spraying systems.

Lowering the pH of flushing water from a pH of 8 to a pH of 7 at 30° C. will decrease ammonia release 90% from 10% ammonia vapor to 1% vapor. Makes efficient use of oxygen by promoting the growth of AOBs over NOBs, thus lowering the amount of oxygen required for oxidizing ammonia.

Remove nitrogen from the system by denitrification and deammonification in downstream areas such as pits and the lagoon thus permitting the treated fluid to be used to irrigate higher cash crops instead of being used to grow crops that absorb nitrogen.

Can be coupled with other processes such as anammox for additional nitrogen removal without added energy input or the use of organic carbon.

Provided within are one or more devices comprising an ability to adjust pH of a fluid, wherein the fluid possesses a concentration of greater than 50 mg/l of ammonia, and wherein the pH of the fluid is adjusted via oxidation of ammonia by addition of oxygen and nitrification of bacteria such that at least a portion of ammonia in the fluid transforms the fluid to nitrites and nitrates, and that reduces the pH of the fluid to a pH no greater than 7.7;

wherein reduction of pH of said reuse fluid is reduced by at least 0.3 pH units from an initial pH of the initial fluid;

wherein the reuse fluid contains animal waste products and at least a portion of the fluid is used to remove waste from structures in which animals exist;

wherein use of the devices reduces a concentration of unionized ammonia in the reuse fluid to less than 2 percent of total ammonia concentration of the initial fluid and wherein the ammonia concentration includes both ammonium and free ammonia.

Wherein the devices condition wastewater derived from animals and wherein influent wastewater entering the devices contains at least 25 percent of organic solids removed compared to organic solids in raw wastewater;

wherein the devices are controllers that control waste water treatment processes by measurement and control of a set of selected measured parameters from a group consisting of dissolved oxygen (DO) levels, pH, Oxidation Reduction Potentials (ORP), alkalinity, ammonia off-gas levels, temperatures, hydraulic retention times (HRT), solids retention times (SRT), computer modeling of one or more waste lagoons, and visual and olfactory inspection;

wherein supplemental heat is provided for nitrification processes at least several hours per year during operation of the devices;

wherein the devices determine and utilize specified time intervals in order to achieve oxidation of ammonia in order to meet requirements necessary for the reuse fluid containing animal waste.

In an additional embodiment is provided, a method for an adjustment of pH of a fluid with a concentration of more than 50 mg/l of ammonia, wherein pH is adjusted by oxidation of ammonia due to oxygenation as well as nitrification of bacteria thereby transforming at least a portion of ammonia of the fluid to nitrites and nitrates, thereby reducing pH of the fluid by at least 0.3 pH units to a pH of 7.7 or less, which also lowers an amount of ammonia released in gaseous form by at least 50 percent;

wherein additional components are tanks providing at least settling capability and wherein the devices provide thickening of the reuse fluid that occurs with or without a thickening agent and wherein the devices provide removal of at least 25 percent of organic solids as compared to raw wastewater.

In a further embodiment is provided, a process for reducing ammonia gas released from fluid containing ammonia levels of greater than 50 mg/l by lowering pH of the fluid using biochemical treatment wherein the biochemical treatment transforms at least a portion of ammonia by nitrification and thereby reduces alkalinity in the fluid;

wherein said biochemical treatment releases hydrogen ions to lower pH and the nitrification reduces pH of the fluid by at least 0.3 pH units to a pH of 7.7;

wherein the nitrification also lowers an amount of ammonia that is released as a gas at least 50%;

wherein controllers control one or parameters selected from a group dissolved oxygen (DO) level, pH, Oxidation Reduction Potential (ORP), alkalinity, ammonia off-gas level, temperature, hydraulic retention time (HRT), solids retention time (SRT), and the process includes process modeling, and visual inspection;

whereby the process is used for making flush water for a waste pit or trough in a structure that houses animals;

wherein the process is controlled by using by one or more controllers that control parameters selected from a group comprising pH, Oxidation Reduction Potential (ORP), ammonia off gas level timed flushing and olfactory inspection.

Another embodiment provides, a method for creating at least two separate portions in a body of fluid comprising; one portion within a body of fluid that is an anaerobic zone and a second portion which is within a body of water that is in an aerobic zone, wherein both an anaerobic portion and an aerobic portion contain animal waste and wherein the anaerobic portion includes an anaerobic zone that is partitioned from an aerobic zone by a physical means in order to separate most fluids into two parts and wherein most flow of the body of fluid between both the anaerobic and aerobic zones are restricted such that fluid from the body of fluid is passing through an area optimizing oxidization of ammonia wherein any quantity of ammonia oxidized is dependent on rate and quantity of flow of the fluid from the body of fluid into and between the anaerobic and aerobic zones;

wherein an average pH of the fluid in said two separate portions differs by at least 0.3;

wherein an average pH of the fluid in the aerobic zone is no greater than 7.7;

wherein oxidation of a quantity of ammonia occurs in a portion selected from a group consisting of an anaerobic portion, an aerobic portion, and a nitrifying portion;

wherein supplemental heat is provided for a nitrification process at least several hours per year while the method is employed;

wherein in addition to a nitrifying portion there is also a portion for denitrification and deammonification;

wherein partitioning is provided by a lagoon curtain and wherein the body of fluid is a body of water;

wherein flush water is conditioned by nitrifying the flush water and reduces pH of flush water by at least 0.3 pH units; reducing pH of wastewater to no greater than 7.7;

wherein the flush water includes water used to remove waste from structures containing animals;

wherein conditioning flush water by nitrifying the flush water to an extent that a concentration of unionized ammonia is less than 2 percent;

wherein conditioning flush water by nitrifying the flush water to limit release of ammonia gas to less than 25 ppm at a monitoring location;

having an additional component providing at least settling capabilities the devices selected from a group consisting of a lagoon, a digester, a settling tank, and a thickening tank wherein thickening occurs with or without a thickening agent and wherein the devices provide an ability to remove at least 25 percent of organic solids removed as compared to removal from raw wastewater.

In additional embodiment, the method for reusing fluid containing animal waste further comprises:

(i) removal of an amount of easily settable organic solids such that a majority of solids that settle from wastewater in less than or equal to one hour, wherein the wastewater is water from animal waste;

(ii) using the wastewater as influent for a biological nitrification system that transforms at least 50 percent of ammonia to nitrite and nitrates and decreases pH of a treated fluid by at least 0.3 pH units and less than or equal to a pH of 7.7 and;

(iii) using at least some treated wastewater as fluid to flush waste from structures that provide shelter for animals.

Temporary waste holding structures are pits and/or troughs and the wastewater is applied as nitrified wastewater to lower pH of flushwater.

The method of the embodiments employs processes that result in suppressing, reducing, controlling and/or eliminating ammonia gas emissions including ammonia off gassing, removal of ammonia from troughs and pits by flushing of animal waste fluids, decreasing nitrogen levels through denitrification and deammonification and control of precipitate buildup in conveyance structures including pipes and channels.

In another embodiment, the method provides a source of water that provides irrigation quality water for crops and a source for nutrient recovery of phosphorus.

In a further embodiment, the method herein provides a source for nutrient recovery of phosphorus.

One embodiment provides for the lowering of pH of the wastewater containing at least 50 mg/l of ammonia to a pH of 7.7 or lower by use of nitrifying bacteria and using the conditioned wastewater as flush water for structures housing animals.

Another embodiment allows the ability to control odors and lower an amount of ammonia gas volatilizing from wastewater to earth's atmosphere by biological mediation that lowers wastewater pH using nitrification processes to consume alkalinity and shift ammonia from a non-ionized form to its ionized form so that it can be released as a gas.

In an additional embodiment, a nitrification process is installed in a lagoon and wherein the nitrification process averages at least 30 percent in total on an annual basis.

In one embodiment, pH reduction averages a drop of 0.3 pH units to reduce ionization of ammonia by 50 percent.

In one embodiment, supplemental heat is provided for the nitrification process at least several hours per year.

In a further embodiment, in order to control and lower overall nitrogen content of a wastewater system by nitrification at least a portion of system effluent is used as flush water for structures that contain animals and nitrified flush water permits increased nitrogen removal via denitrification and deammonification and wherein at least 10 percent of the ammonia entering the nitrification process is transformed to nitrite and nitrate.

In one embodiment, removal of ammonia and decreasing nitrogen levels through denitrification and deammonification reduce precipitate buildup in conveyance structures including pipes and channels.

In another embodiment, maintaining an atmospheric ammonia level averaging less than 25 ppm in structures by use of flush water is obtained by recycled wastewater that is altered via biochemical reactions to lower pH of the wastewater by at least 0.3 pH units and to a pH of 7.7 or lower by addition of oxygen to the wastewater thus nitrifying bacteria to oxidize ammonia which consumes alkalinity and lowers the pH of the flush water.

A further embodiment provides, a method for creating two zones in a body of fluid comprising one zone with a body of fluid that is an anaerobic zone and a second zone which is an aerobic zone wherein both the anaerobic zone and the aerobic zone contain animal waste and wherein the anaerobic zone is partitioned from the aerobic zone by a physical means to separate fluids and wherein most flow of the body of fluid between both anaerobic and aerobic zones is restricted such that fluid from the body of fluid is passing through an area that optimizes oxidization of a quantity of ammonia that is dependent on rate and quantity of flow of the fluid from the body of fluid into and between the two zones.

In an additional embodiment, partitioning is provided by a lagoon curtain and wherein said body of fluid is a body of water.

In a final embodiment, the method also lowers ammonia gas emissions by use of flush water of which at least some of the flush water has been modified by biological processes to lower the pH of the flush water to at least 7.7 or lower. 30. A process of lowering the pH of wastewater containing at least 50 mg/l of ammonia to a pH of 7.7 or lower by the use of nitrifying bacteria and using the conditioned wastewater as flush water for structures housing animals.

BRIEF DESCRIPTION OF THE FIGURES

FIG. 1A is schematic of a typical animal husbandry process producing swine in structures with collect feces and urine in a storage pit also showing the location of the disclosed Nutrient and Odor Management System (NOMS) in the wastewater treatment process.

FIG. 1B is a variant of the present disclosure and associated system that collects lagoon effluent into flush tanks and flushes waste along troughs which flushes to the lagoon also showing the location of the disclosed Nutrient and Odor Management System (NOMS) in the wastewater treatment process.

DETAILED DESCRIPTION

The present disclosure relates to the biochemical conditioning of wastewater for use as flush water to reduce atmospheric ammonia emissions. It has been determined that release of ammonia from liquid as a gaseous emission can be reduced by an additional 50% or more by lowering the pH of the liquid by at least 0.3 pH units. Lagoon wastewater from swine operations tends to average approximately 8.0 with a range of plus or minus 0.3 units. Suppression of ammonia odors can be especially important when wastewater contains ammonia in higher concentrations of 50 mg/l or greater which can cause significant off gassing of ammonia when the pH is elevated to levels of 7.7 or more which can cause 2% or more of the ammonia to be in the form of $NH_3$ which can off gas. Ammonia off gassing can also be a particular problem when the gas is released into a structure inhabited by animals and humans.

This treatment can also be used to reduce other odors and the overall levels of ammonia and nitrogen in a wastewater system by combining with other biological processes including denitrification and deammonification. Production of compounds containing oxygen including nitrite and nitrate can also sequester emanation of other odors. In addition, the onset of anaerobic conditions and associated problems can begin since they produce a source of oxygen for other oxidative processes thus delaying the onset of a reducing environment in which no free (dissolved oxygen) or combined oxygen (such as nitrate) is present in a liquid.

Figure 1A:
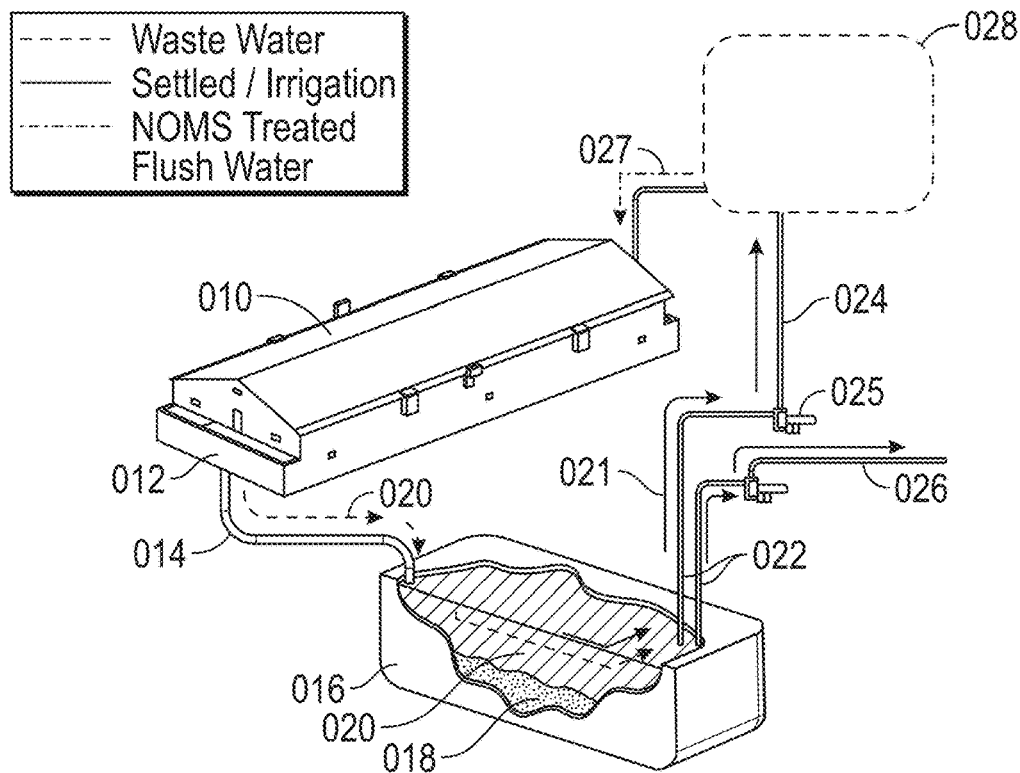
FIGS. 1A and 1B are schematic representations of two types wastewater treatment in a common animal husbandry process and wastewater system associated with the husbandry process.
Figure 1B:
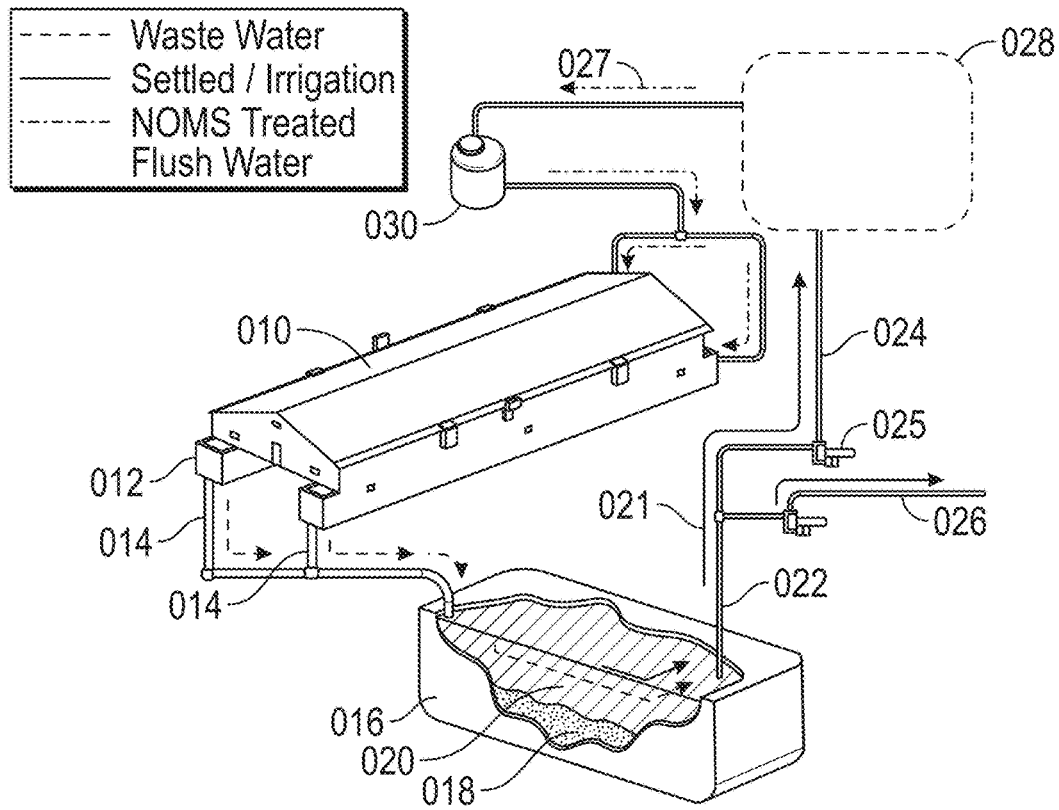

FIGS. 1A and 1B are schematic representations of two types wastewater treatment in a common animal husbandry process and wastewater system associated with the husbandry process.

FIG. 1A is an animal husbandry process producing swine in structures, such as a swine barn [010], which collect feces and urine in one or more storage pits [012] under slatted areas of the swine barn [010] which is periodically drained or flushed through waste drain pipes [014] to a waste lagoon [016] for storage and partial treatment including settling of organic solids [018] from wastewater [020] and of which a part of the lagoon effluent [022] can be recirculated using at least one transfer pump [025] via a recirculation and flush line [024] and used to recharge and flush waste from structures which enclose animals, such as a [010], and other lagoon effluent [022] can be used for other purposes such as effluent for irrigation [026]. The waste storage pit [012] under the barn is filled approximately halfway with fluid (generally recycled partially treated wastewater from the waste lagoon [016]) and the waste storage pit [012] is periodically drained or flushed through waste drain pipes [014] every few days which sluices the waste and fluid to the waste lagoon [016] The waste storage pit [012] is then refilled for another cycle which can generally last from 3 to 14 days. This waste arrangement is sometimes referred to as a "pull plug system" since a plug is pulled to drain the waste to the waste lagoon [016] and then reinserted afterwards allowing the pit to be again filled with flush water [027]. The disclosed Nutrient and Odor Management System (NOMS) [028] biochemically conditions wastewater [020] for use as flush water [027] to reduce the potential for atmospheric ammonia emissions by an additional 50% or more by reducing the pH of the wastewater by at least 0.3 pH units to a pH of 7.7 or less. The Nutrient and Odor Management System (NOMS) [028] is shown in more detail in FIG. 1C.

FIG. 1B is a variant of this system that collects lagoon effluent [022] into flush tanks [030] and flushes waste through waste troughs [014] or similar structures in swine barns [010] through waste drain pipes [014] to a waste lagoon [016] for storage and partial treatment such as settling of organic solids [018] from wastewater [020] and of which a part of the lagoon effluent [022] can be recirculated via a recirculation and flush line [024] and used as recharge and flush water [024] to flush waste from structures which enclose animals [010] and other lagoon effluent [022] can be used for other purposes such as effluent for irrigation [026]. The flushing water [027] that is used is withdrawn from the waste lagoon [016] and can be routed through the Nutrient and Odor Management System (NOMS) [028], and then through pit flush tanks [030] at each barn which can flush feces and urine up to several times a day from the swine barn [010].

NOMS [028] biochemically conditions wastewater [020] for use as flush water [027] to reduce the potential for atmospheric ammonia emissions by an additional 50% or more by reducing the pH of the wastewater by at least 0.3 pH units to a pH of 7.7 or less, with the range usually between a pH 7.7 and 8.3. The pit flush tanks [030] themselves can be modified to include an embodiment of the NOMS [028] which nitrifies water in the pit flush tank [030] as it fills and flushes. The Nutrient and Odor Management System (NOMS) [028] is shown in more detail in FIG. 1C.

Figure 1C:
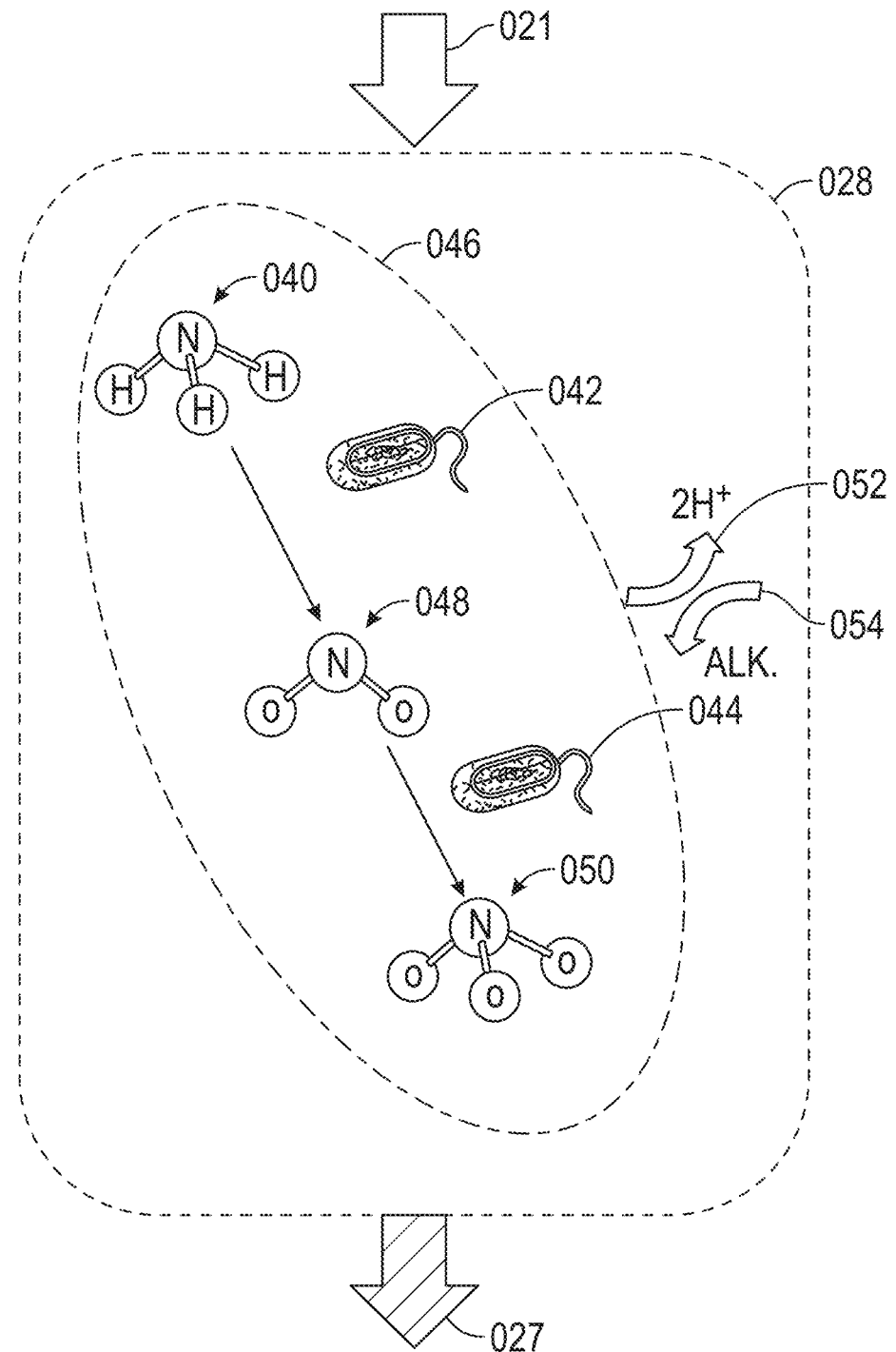
FIG. 1C is an embodiment the disclosed Nutrient and Odor Management System.

FIG. 1C illustrates an embodiment of the nutrient and odor management system (NOMS) [028]. One embodiment of the NOMS [028] biochemically lowers the pH of the recycled wastewater or flush water [027] by transforming ammonia [040] using microorganisms including Ammonia Oxidizing Bacteria [042] and Nitrite Oxidizing Bacteria [044] to nitrify ammonia to nitrite [048] and nitrate [050] using a nitrifying process [046].

Nitrification in nature is a two-step oxidation process of ammonium ($NH_4^+$) or ammonia ($NH_3$) [040] to nitrate ($NO_3^-$) [050] catalyzed by two ubiquitous bacterial groups. The first reaction is oxidation of ammonia [040] to nitrite [048] by ammonia oxidizing bacteria (AOB) [042] represented by the "*Nitrosomonas*" genus. The second reaction is oxidation of nitrite ($NO_2$) [048] to nitrate [050] by nitrite-oxidizing bacteria (NOB) [044], represented by the "*Nitrobacter*" genus. Characteristics of AOB [042] and NOB [044] are outlined in Table 1 and Table 2.

Certain bacteria can mediate one of the two steps of oxidation from ammonia to nitrate and there are some organisms that can mediate both steps of oxidation. Organisms that mediate both oxidative steps are sometimes referred to as comammox (COMplete AMMonia OXidizer) and certain species of *Nitrospira* including *Nitrospira inopinata* are representative comammox organisms and organisms of this type are included in this disclosure.

TABLE 1

Ammonia Oxidizing Bacteria

| Genus | Phylogenetic group | DNA (mol % GC) | Habitats | Characteristics |
|---|---|---|---|---|
| *Nitrosomonas* | Beta | 45-53 | Soil, Sewage, freshwater, Marine | Gram-negative short to long rods, motile (polar flagella)or nonmotile; peripheral membrane systems |
| *Nitrosococcus* | Gamma | 49-50 | Freshwater, Marine | Large cocci, motile, vesicular or peripheral membranes |
| *Nitrosospira* | Beta | 54 | Soil | Spirals, motile (peritrichous flagella); no obvious membrane system |

TABLE 2

Nitrite Oxidizing Bacteria

| Genus | Phylogenetic group | DNA (mol % GC) | Habitats | Characteristics |
|---|---|---|---|---|
| *Nitrobacter* | Alpha | 59-62 | Soil, Freshwater, Marine | Short rods, reproduce by budding, occasionally motile (single subterminal flagella) or non-motile; membrane system arranged as a polar cap |

TABLE 2-continued

Nitrite Oxidizing Bacteria

| Genus | Phylogenetic group | DNA (mol % GC) | Habitats | Characteristics |
|---|---|---|---|---|
| *Nitrospina* | Delta | 58 | Marine | Long, slender rods, nonmotile, no obvious membrane system |
| *Nitrococcus* | Gamma | 61 | Marine | Large Cocci, motile (one or two subterminal flagellum) membrane system randomly arranged in tubes |
| *Nitrospira* | Nitrospirae | 50 | Marine, Soil | Helical to vibroid-shaped cells; nonmotile; no internal membranes |

The nitrifying process [046] release two hydrogen ions [052] which lowers the alkalinity [054] of the settled wastewater [021] by 7.1 pounds of alkalinity and 4.4 pounds of oxygen for each pound of ammonia [040] oxidized. The treated wastewater [027] exiting the NOMS [028] has a lower pH and ammonia and higher nitrites and nitrates (↓, pH, $NH_3$; ↑$NO_2^-$, $NO_3^-$).

Nitrification [046] sequentially converts ammonia [040] to nitrite [048] and ultimately nitrate [050] and this process can be summarized as follow:

$$NH_4^+ + 1.5O_2 \rightarrow AOBs \rightarrow NO_2^- + H_2O + 2H^+$$

(AOBs convert ammonia to nitrite, using oxygen 1.5 units of $O_2$ and releasing two hydrogen ions)

$$NO_2^- + 0.5O_2 \rightarrow NOBs \rightarrow NO_3^-$$

(NOBs convert nitrite to nitrate, using 0.5 units of $O_2$)
The overall reaction is as follows:

$$NH_4^+ + 2O_2 \rightarrow NO_3^- + 2H^+ + H_2O$$

(AOBs and NOBs using a combined two units of $O_2$ and releasing two hydrogen ions)

Since alkalinity is the capacity of water to resist changes in pH (buffering capacity), this reduction of alkalinity [054] causes the pH to be lowered in the settled wastewater [021]. As the pH of the wastewater is lowered the percentage of free ammonia, NH3, that can volatilize as a gas decreases because it is transformed into an ionized form, ammonium, $NH_4^+$, that cannot volatilize as a gas. A pH change of 0.3 units will decrease the amount of un-ionized ammonia by 50% and thus reduce the potential volatilization by the same amount. Nitrification [046] is an unrecognized efficient and economical method to lower the pH of wastewater.

Nitrification [046] is used in wastewater treatment to transform ammonia [040] to nitrite [048] and nitrate [050], which tends to cause less environmental issues in aquatic systems. Nitrification is not used as a process to reduce pH of a wastewater. In practice the depression of pH caused by nitrification [046] is often viewed as a nuisance since as the pH decreases to a pH of 7.7 or lower the nitrification process [046] does not work as well and often additional alkalinity (in the form of lime or soda ash) must be added to permit full nitrification to continue to occur below this pH.

Nitrifiers are slow growing compared to other bacteria common to wastewater and have a doubling time of approximately two days compared to less than an hour for most heterotrophic wastewater bacteria. They are autotrophs and use inorganic carbon for growth which is why they require alkalinity. Nitrifiers also require 4.4 pounds of oxygen per pound of ammonia they convert to nitrate. This slow growth and high oxygen requirement permit heterotrophic organisms to outcompete them and in a lagoon the heterotrophs use much of the oxygen as they out-compete nitrifiers. This means that organic carbon is preferentially removed by heterotrophs before nitrifiers convert ammonia thereby increasing oxygen requirements to nitrify since organic carbon oxygen demand must be first satisfied. It is common for lagoons to reduce biological oxygen demand (BOD) by as much as 85% to 95% while only transforming 40% to 80% of the ammonia that enters the lagoon. Thus, locating the NOMS after a process which reduces available organic carbon will decrease overall oxygen requirements significantly.

Two additional features of the NOMS are that locating the process after reducing organic carbon and attendant oxygen demand will significantly decrease the required size of the treatment unit. For example, one well documented study collected extensive data over three years (Vanotti August 2018) presented results from a three year study of a representative large piggery operation (seven barns raising 5,296 pigs per cycle and 2.5 cycles per year that flushed to two lagoons with a combined volume of 7 million gallons). Average influent and effluent concentrations to the two lagoons before additional treatment were BODs of 7,364 mg/l before and 205 mg/l after and ammonia of 1,290 mg/l before and 428 mg/l after. Locating the NOMS system after the lagoons would decrease organic carbon oxygen demand by 7,159 mg/l (7,364–205) and nitrification oxygen demand by 3,792 mg/l ((1,290–428)×4.4). Additionally, it would not be necessary to nitrify all the ammonia in the NOMS to lower the pH adequately. Overall oxygen savings from relocating the ammonia oxidation process would be approximately 11,000 mg/l and the NOMS would only require 2,088 mg/l of oxygen to be added (205+(428×4.4)) which represents over an 80% savings in oxygen. Sizing of the NOMS system would also be reduced and require significantly less tankage, air blowers, etc.

Another feature of locating the NOMS in a location where it needs to condition only flush water is that lagoon effluent that is withdrawn for other uses does not require treatment. This would further reduce the amount of wastewater requiring treatment and also preserve nutrients for other uses such as a nitrogen supplement in irrigation.

Reducing the size requirement of the NOMS also has two additional advantages. Firstly, it makes it much more economical to heat the process as required. Nitrifiers are most efficient at a temperature range of 25 OC to 30° C. and perform poorly at temperatures below 15° C. This is a particular problem in cold weather and many wastewater treatment plants lose the ability to nitrify when water temperature drops to below 15° C. The NOMS system could receive supplemental heat during colder weather and thus be able to maintain its performance throughout the year.

Secondly, it makes it easier to culture AOBs over NOBs. Alkalinity is consumed by AOBs and preferentially culturing AOBs will also reduce oxygen required. Furthermore, AOBs produce nitrite which is one of the feedstocks necessary for deammonification. This permits the overall wastewater process to be modified to encourage deammonification instead of denitrification.

Denitrification may still occur, but denitrification of nitrite only increases alkalinity of the wastewater by half of what is caused by denitrification of nitrate.

Another novel feature of the claimed NOMS system is that it effectively suppresses ammonia from off gassing by using nitrification to depress pH which in turn lowers the alkalinity of the wastewater instead of requiring that substantially all ammonia be nitrified. This new use of the nitrification process to suppress ammonia odors by depressing the pH is a much more efficient and effective method compared with the present approaches which seek to remove substantially all ammonia to suppress ammonia gas emanations.

This previously unrecognized feature of nitrification permits effective ammonia odor suppression while requiring that only ammonia only need be removed to the extent that it lowers the pH of the wastewater to the desired level to keep ammonia from off gassing. This equates to one-third to two-thirds of the total ammonia and further lowers the amount of oxygen necessary to nitrify lagoon effluent [022] to about 10% to 20% of that required to nitrify lagoon influent.

the lagoon as with the larger flushing flow rates or it can be diverted to a special system to recycle nutrients. Smaller flow rates possess a lower organic carbon content but higher nitrogen and phosphorus concentrations, leading to an attraction for specialized wastewater treatment. A third case includes a portion of the nitrified wastewater which may be diverted to the lagoon to serve as a seed to enhance nitrification within the lagoon. Seeding nitrifiers into the lagoon can greatly accelerate the overall reduction of nitrogen in the lagoon. Enhancing nitrification in the lagoon can also result in a lower pH in the lagoon which will further reduce ammonia emissions. A fourth scenario involves NOMS permitting optimized nutrient removal in all parts of the husbandry system. As the nitrified wastewater reduces the level of nitrogen exiting the troughs and pits as well as in the lagoons, it will start a cycle where each successive flushing cycle will lower the effluent organic carbon and nitrogen.

Figure 1D:
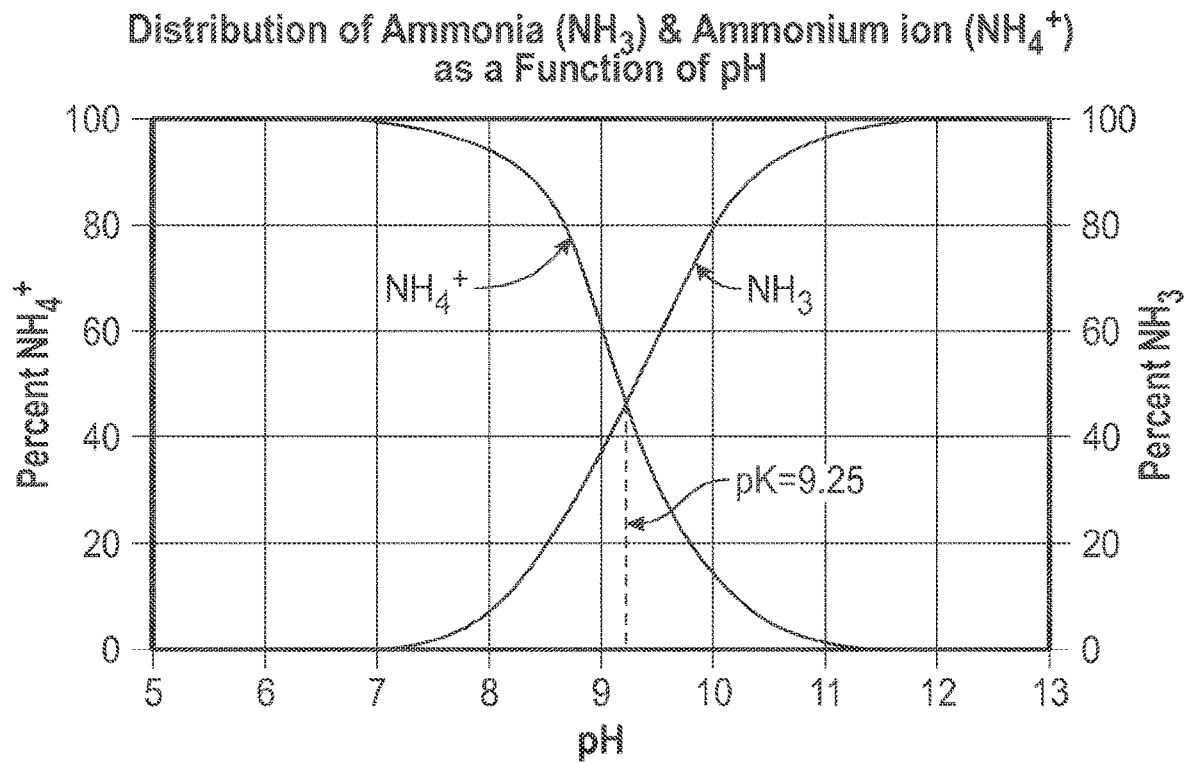
FIG. 1D provides a graph illustrating how a pH shift affects the ionization of ammonia.

FIG. 1D provides a graph illustrating how a pH shift affects the ionization of ammonia. FIG. 1D shows the percent of un-ionized ammonia ($NH_3$) and ammonium ($NH_4^+$) depending on pH of the liquid with 50% of each at a pH of 9.25. Table 3, provided below, shows the percent of un-ionized ammonia between the pH of 6 to 8 and a temperature of 20 OC to 25° C.

Figure 1E:
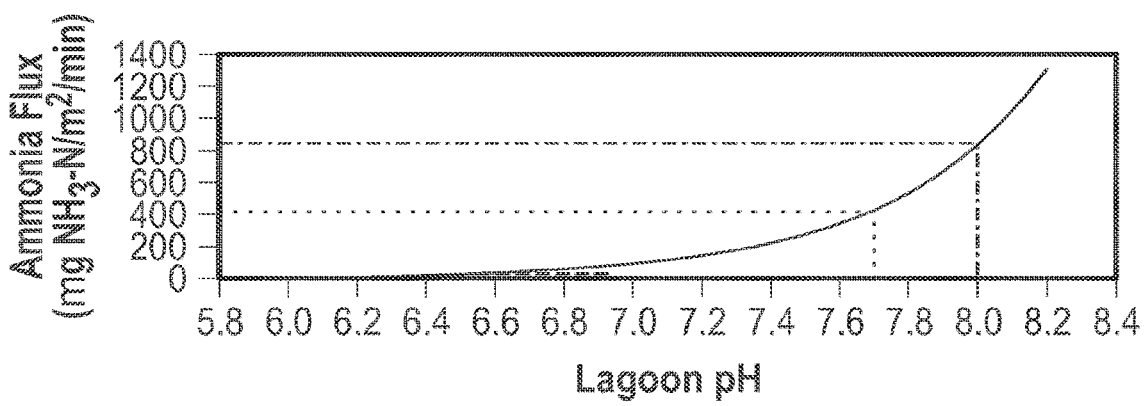
FIG. 1E is a graph illustrating the effect of pH on ammonia emanations from swine lagoons.

FIG. 1E provides a graph illustrating the effect of pH on ammonia emanations from swine lagoons. FIG. 1E illustrates the amount of ammonia flux (i.e. ammonia off gassing) from swine lagoons based on modeling by Aneja, et. al, September 2001. This graph indicates that ammonia flux is highly influenced by the pH of the lagoon wastewater and decreases by half, from 800 to 400 µg NH3-N/m2/min, when the pH is decreased from 8.0 to 7.7.

TABLE 3

Percent Un-ionized $NH_3^-$, In Aqueous Ammonia Solutions

| pH | Temperature, ° C. | | | | | | | | | | |
|---|---|---|---|---|---|---|---|---|---|---|---|
| | 20.0 | 20.5 | 21.0 | 21.5 | 22.0 | 22.5 | 23.0 | 23.5 | 24.3 | 24.5 | 25.0 |
| 6.0 | .0397 | .0412 | .0427 | .0443 | .0459 | .0476 | .0493 | .0511 | .0530 | .0549 | .0569 |
| 6.1 | .0500 | .0518 | .0538 | .0557 | .0578 | .0599 | .0621 | .0644 | .0667 | .0691 | .0716 |
| 6.2 | .0629 | .0653 | .0677 | .0702 | .0727 | .0754 | .0782 | .0810 | .0839 | .0870 | .0901 |
| 6.3 | .0792 | .0821 | .0852 | .0883 | .0916 | .0949 | .0984 | .102 | .105 | .109 | .113 |
| 6.4 | .0997 | .103 | .107 | .111 | .115 | .119 | .124 | .128 | .133 | .138 | .143 |
| 6.5 | .125 | .130 | .135 | .140 | .145 | .150 | .156 | .162 | .167 | .173 | .180 |
| 6.6 | .158 | .164 | .170 | .175 | .183 | .189 | .196 | .203 | .211 | .218 | .225 |
| 6.7 | .199 | .206 | .214 | .222 | .230 | .238 | .247 | .256 | .265 | .275 | .284 |
| 6.8 | .250 | .259 | .269 | .279 | .289 | .300 | .310 | .322 | .333 | .345 | .358 |
| 6.9 | .315 | .326 | .338 | .351 | .364 | .377 | .390 | .405 | .419 | .434 | .450 |
| 7.0 | .396 | .410 | .425 | .441 | .457 | .474 | .491 | .509 | .527 | .546 | .566 |
| 7.1 | .498 | .516 | .535 | .555 | .575 | .596 | .617 | .640 | .663 | .687 | .711 |
| 7.2 | .625 | .649 | .673 | .697 | .723 | .749 | .776 | .804 | .833 | .863 | .894 |
| 7.3 | .786 | .815 | .845 | .876 | .908 | .941 | .975 | 1.01 | 1.05 | 1.08 | 1.12 |
| 7.4 | .988 | 1.02 | 1.06 | 1.10 | 1.14 | 1.18 | 1.22 | 1.27 | 1.31 | 1.36 | 1.41 |
| 7.5 | 1.24 | 1.29 | 1.33 | 1.38 | 1.43 | 1.48 | 1.54 | 1.59 | 1.65 | 1.71 | 1.77 |
| 7.6 | 1.56 | 1.51 | 1.67 | 1.73 | 1.80 | 1.86 | 1.93 | 2.00 | 2.07 | 2.14 | 2.22 |
| 7.7 | 1.95 | 2.02 | 2.10 | 2.17 | 2.25 | 2.33 | 2.41 | 2.50 | 2.59 | 2.68 | 2.77 |
| 7.8 | 2.44 | 2.53 | 2.63 | 2.72 | 2.82 | 2.92 | 3.02 | 3.13 | 3.24 | 3.35 | 3.47 |
| 7.9 | 3.06 | 3.17 | 3.28 | 3.40 | 3.52 | 3.64 | 3.77 | 3.90 | 4.04 | 4.18 | 4.33 |
| 8.0 | 3.82 | 3.96 | 4.10 | 4.24 | 4.39 | 4.55 | 4.70 | 4.87 | 5.03 | 5.21 | 5.38 |

Figure 2:
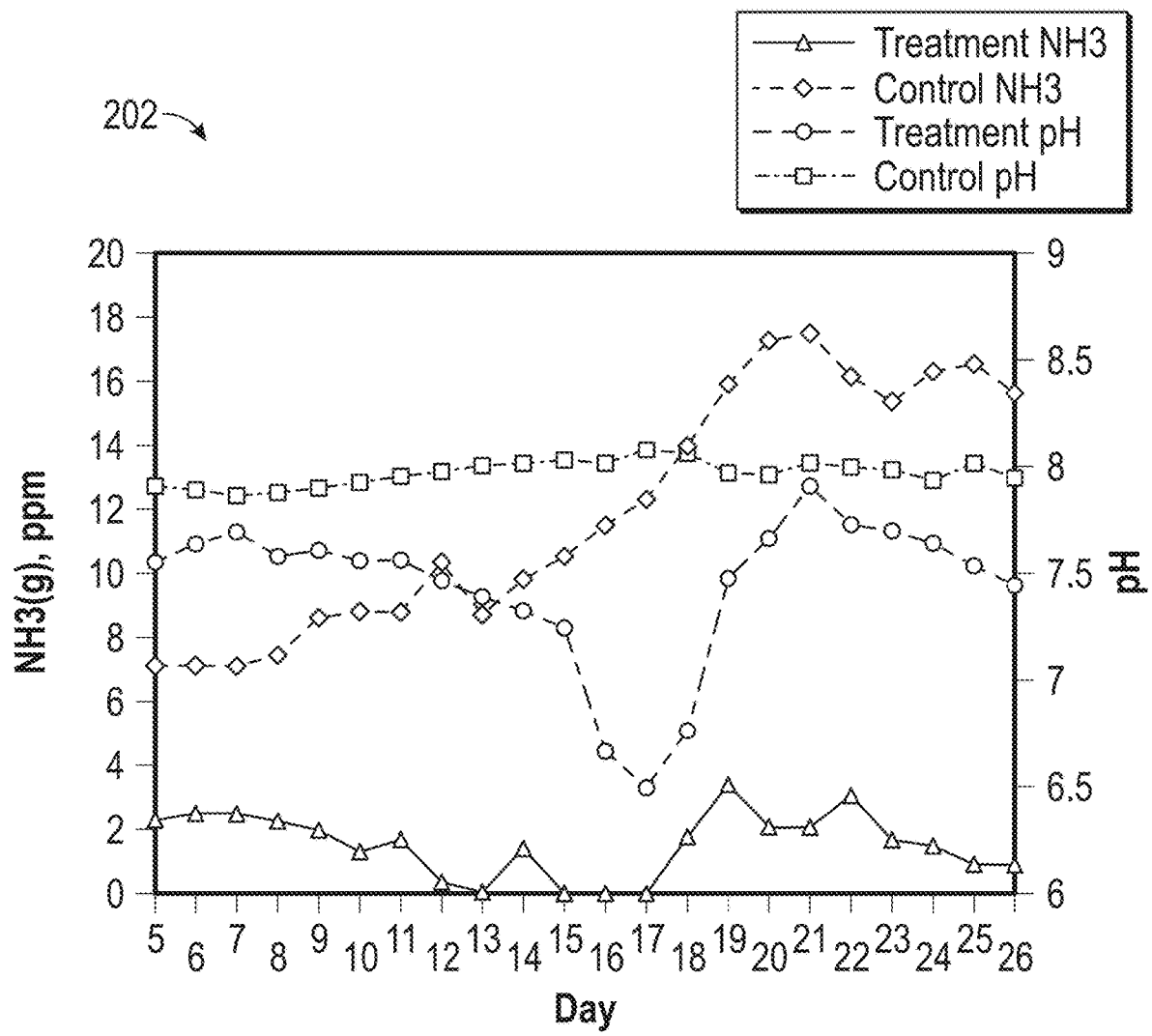
FIG. 2 shows the results from pilot testing of the Nitrogen and Odor Management System.
Figure 2:
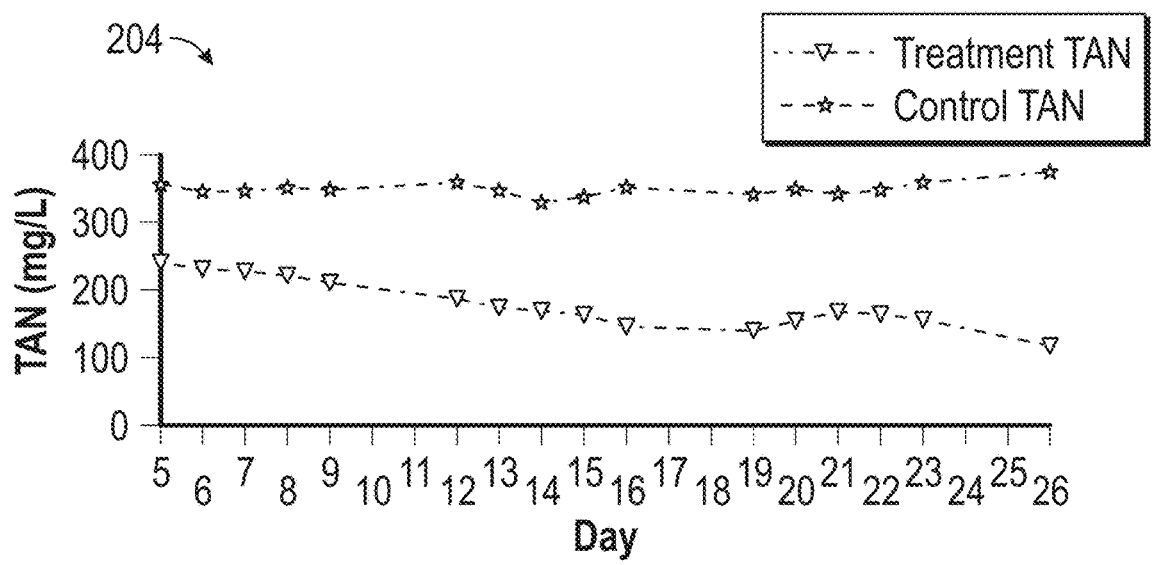

Nitrified wastewater from the NOMS can be used in several beneficial ways in addition to flushing. Using a flow of a small amount of nitrified wastewater such as a tenth to a quarter of which is used for full flushing of solids can be diverted to the troughs/pits to keep the troughs and pits fresher using a lower pH is possible. The lower overall flow rate of wastewater can be relatively steady or can consist of periodic flows (such as hourly) depending on the desired effect. This lower flow rate of flushing water can be sent to FIG. 2 shows the results from pilot testing of the Nitrogen and Odor Management System.

Research conducted to verify that use of a Nutrient and Odor Management System could effectively lower the pH of swine wastewater effectively control ammonia off gassing. A 26-day test was conducted using a swine wastewater with the first five days being used to establish steady state conditions. The 21-day operational period was as follows:

The test used two 35 L covered reactors, one (the treatment reactor) with an active nitrification unit and the other (the control reactor) with an inactive nitrification unit. Each reactor received 1.75 L/day of swine lagoon feed and the equivalent was withdrawn. The air quality of above each reactor was measured each day with an ammonia meter and the pH of the wastewater was also monitored. The treatment reactor received 2 ppm of air for nitrification while the control reactor received none. Both reactors received sweep gas in the top of the reactor to simulate air flow and permit monitoring of ammonia off gas emissions.

The treatment reactor was able to successfully prevent significant ammonia gas from escaping by maintaining a pH generally below 7.7 while the sham reactor had a relatively constant pH of 8 which is common for swine lagoon wastewater, The treatment reactor was able to suppress ammonia off gassing to 2 ppm and less while the control reactor had approximately five times the level of ammonia gas (ranging from 7 to 18 ppm) Additionally, it can be seen that the total ammonia nitrogen (TAN) level in the liquid columns of the treatment reactor decreased from approximately 230 to 120 mg/L—a 48% reduction indicating that it is not necessary to nitrify all the ammonia in order to successfully suppress ammonia off gassing.

Figure 3:
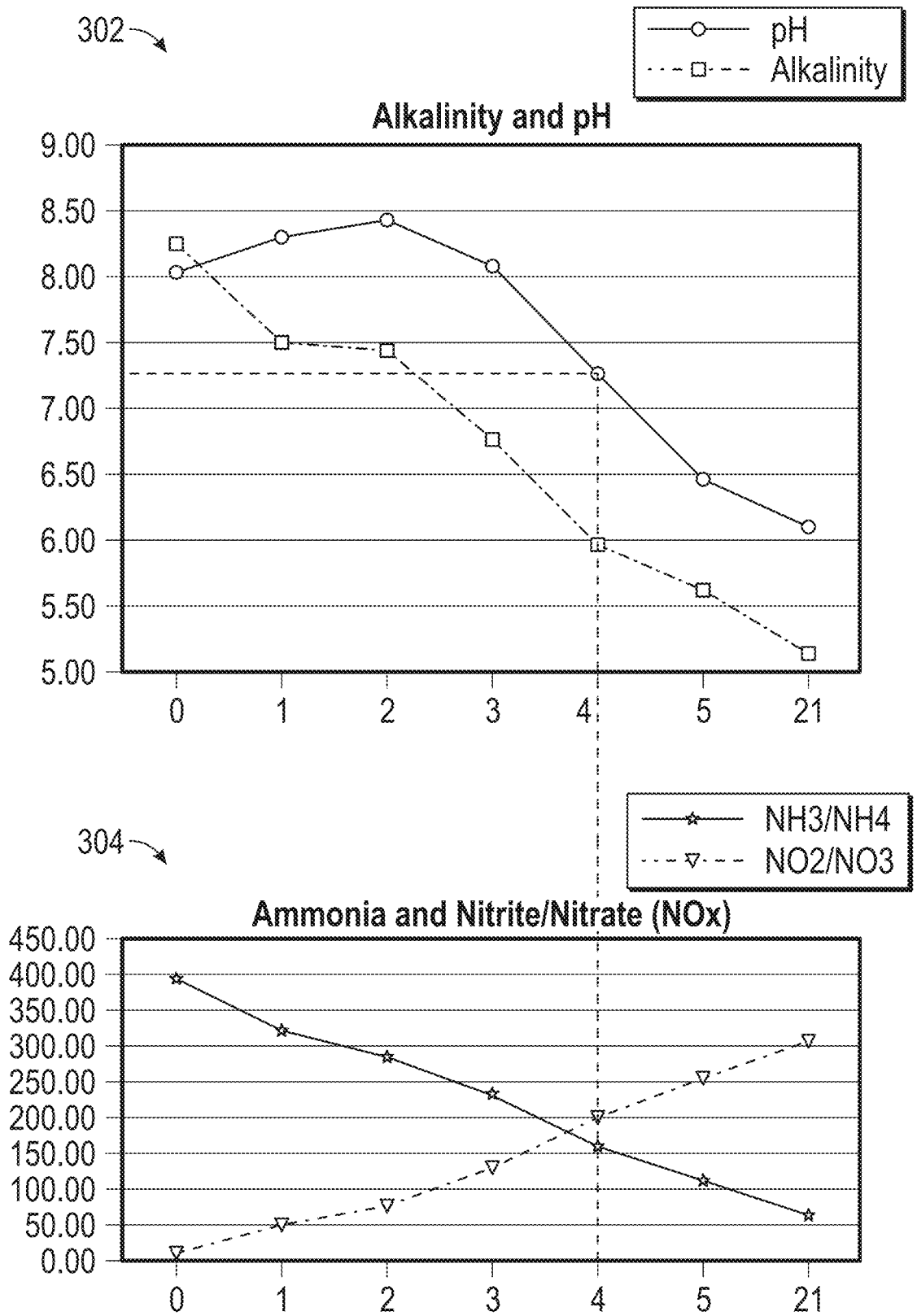
FIG. 3 presents the results of testing of effluent from a large swine lagoon in North Carolina to determine the amount of nitrification necessary to depress pH for installation of a Nutrient and Odor Management System.

FIG. 3 presents the results of testing of effluent from a large swine lagoon in North Carolina to determine the amount of nitrification necessary to depress pH for installation of a Nutrient and Odor Management System. Data from this study is presented in Table 4. The results of the test indicate that a NOMS system could nitrify sufficiently to reduce swine lagoon effluent to pH 7.3 within 4 hours [302]. This level would be sufficient to lower off gassing of ammonia and provides an additional factor of safety beyond lowering the pH to 7.7 which is sufficient to lower the amount of ammonia that can off gas to less than 2%. Additionally, the data show that this level of effectiveness can be attained by nitrifying approximately half of the ammonia instead of requiring virtually all the ammonia to be nitrified.

TABLE 4

Nitrification Test for NOMS

| Treatment | Time hours | NH3/NH4 mg/L | NO2/NO3 mg/L | Alkalinity mg/l as CaCO3 | pH units |
|---|---|---|---|---|---|
|  | 0 | 394.50 | 9.40 | 2035.50 | 8.04 |
| North Carolina | 1 | 323.10 | 49.30 | 1575.50 | 8.31 |
| Swine | 2 | 286.70 | 76.90 | 1534.00 | 8.44 |
| Lagoon Wastewater | 3 | 235.00 | 129.10 | 1121.50 | 8.09 |
|  | 4 | 160.80 | 200.90 | 616.50 | 7.28 |
|  | 5 | 113.50 | 256.20 | 396.50 | 6.49 |
|  | 21 | 64.60 | 309.80 | 105.00 | 6.12 |

Figure 4A:
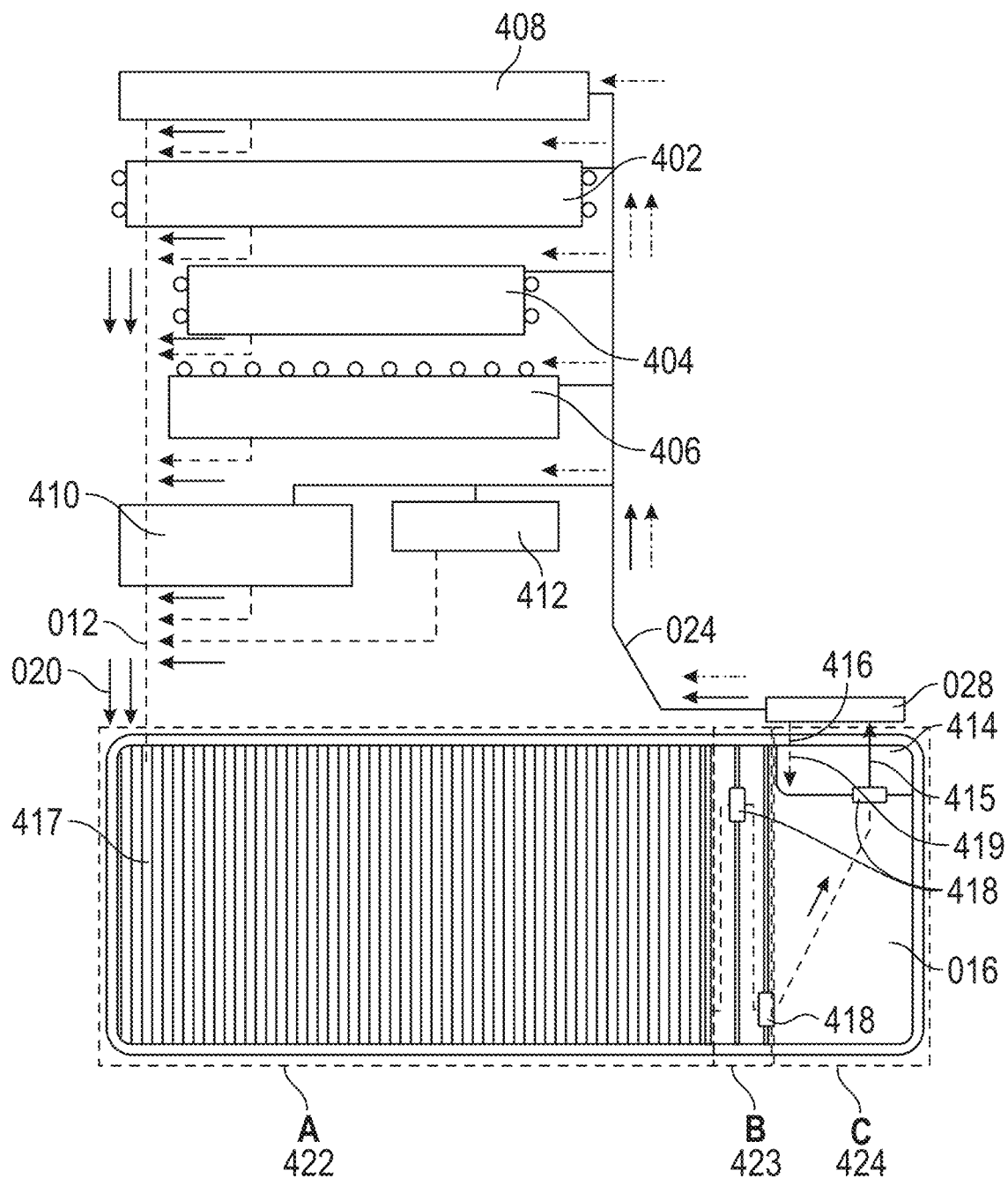
FIGS. 4A and 4B are a schematic of the disclosed invention sized to control ammonia gas emissions from a swine operation that processes 2,400 farrow swine and 600 gilts (female swine under 1 year) per cycle.
Figure 4B:
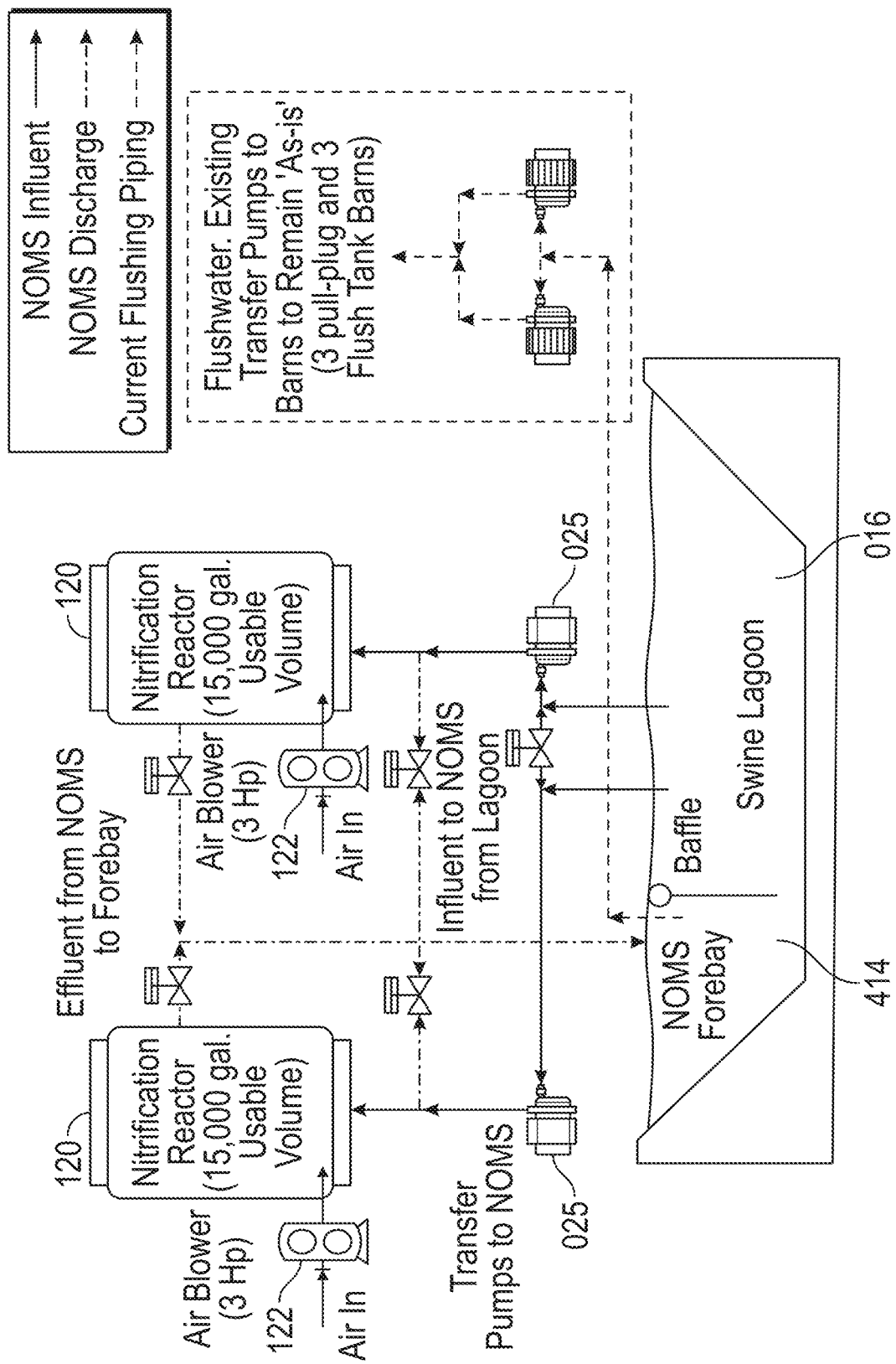

FIGS. 4A and 4B are schematics of the in-lagoon NOMS [028], in which the system has been sized to control ammonia gas emissions from a swine operation that processes 2,400 farrow swine (birthing swine) and 600 gilts (female swine under one year) per cycle. It is sized to reduce the current level of ammonia emissions in barns by at least 50% and remove approximately 25% to 35% of the nitrogen generated by swine husbandry operations. The NOMS [028] will lower ammonia emissions in the barns and more than offset the increased ammonia emissions that would result from covering of the lagoon (this disclosure assumes that the lagoon is uncovered and will be covered as part of an overall larger project).

Removal of approximately 25% to 35% of the nitrogen from the overall wastewater system will partially offset the increased nitrogen level in the lagoon due to elimination of nitrification/denitrification that will result from covering of the lagoon. Additionally, by adjusting the size and operation of this system, up to 90% of the nitrogen generated by swine husbandry can be removed from the wastewater system. If additional nitrogen removal is desired after installation of the system this additional removal can be readily accommodated by expansion, such as adding additional tankage and equipment to reach the desired level of nitrogen removal and suppression of ammonia off gassing.

The system shown and described in FIG. 4A is sized for a farm that processes 2,400 farrow swine and 600 gilts per cycle with 2½ cycles per year. The swine farm has six barns [010] where three barns have troughs with flush tanks, referred to as "flush tank barns" [402, 404, 406], that flush several times per day, and where the remaining three barns have pull/plug systems with pits under them, referred to as pull-plug barns [408, 410, 412]. The wastewater from the barns [402-412] is flushed via waste drain line [012] into a waste lagoon [016] with a capacity of 12 million gallons.

For sizing purposes an estimate of 1,100,000 lbs. of swine was used (2,400×4331 lbs and 600×100 lbs). Estimated N (nitrogen) waste production was 0.0177 lbs. N per 100 lbs. swine or a total of 195 lbs. of N per day. Volume of waste (without flushing water) would be 10,825 gallons of flushed waste at 1 gpd (gallons per day) per 100 lbs. of swine weight). Previous studies have shown that ammonia emissions can be effectively controlled if flush water [027] is equal to the wastewater [020] generated. These criteria equate to the need for approximately 12,000 gpd of treated flush water [027] per day for this system.

The large difference of flushing flows before and after the use of the system is due to the mechanism of operation of the NOMS [028]. The flush water [027] currently drawn from the waste lagoon [016] contains approximately 600 mg/l of N and this is used to flush out wastewater [020] that has a content of approximately 2,000 mg/l of N. The high ammonia level of the flush water requires constant flushing and the level of ammonia in the troughs averages about 1,000 to 1,500 mg/l even after five or six flushes per day. The disclosed NOM system will significantly lower the need for 72,000 gallons per day currently used to flush the barns.

The NOMS will produce nitrified, low pH flush water with free ammonia of less than 100 mg/l and pH to 7.3 or less. This is a higher reduction than the target pH reduction to 7.7 in order to provide a factor of safety and also increase the length of time between flushing the pits, as once the pH is raised significantly the contents of the waste pit [012] may be odorous and require flushing. In general an addition factor of safety of 0.4 pH units is recommended, thus the target pH reduction would be to 7.3 in order to ensure the contents of the waste pit [012] can remain below 7.6 between flushes and to account for variability in the wastewater [020]. The highly nitrified, low pH flush water [027] will lower the amount of free ammonia emissions from the pits by more than 50%. Additionally, the nitrified flush water [027] will be denitrified and deammonified in the waste pits [012] and waste lagoons [016], thus permanently removing between 25% to 33% of the nitrogen from the system (removal rates during warm weather may approach twice this amount).

Using an average flush rate of 12,000 gpd will require a system with usable reactor volume of 36,000 gallons. A lagoon cover [417] can be implemented based on the needs of the wastewater treatment system. The major components of this embodiment of the NOMS [028] are illustrated in FIGS. 4B and 4C as follows:

- Two reactors [120], each with a usable capacity of 18,000 gallons (including space for freeboard and other items could bring total tank volume to 20,000)
- Two air blowers [122], each 2 to 3 hp (interconnected for redundancy)
- Aeration system [124] for each tank—medium bubble non-clog diffusers capable of mixing as well as aeration
- Settling and withdrawal launder system [126] for each tank
- Connecting piping and valves [128]
- Mixers [130] in each tank to provide supplemental mixing as desired.
- Two 1-hp influent pumps (interconnected for redundancy) [025]
- Media such as plastic kaldnes KI biomedia or PVC honeycomb media [134] could be added to support attached growth
- Mixer [136] could be used to keep contents stirred when air is not being used
- Electrical and Instrumentation and controls [138]
    - Control of the system could be based on maintaining the process until a target pH is reached for a reactor [120] at which time mixing and aeration to the tank would be stopped to provide a time for the nitrifiers to settle. The top third to half of the reactor contents could be used for flushing water to the barns or cycled to the waste storage lagoon forebay [414, as shown in FIGS. 4A and 4B] for use when needed.
    - Another control system that could be used including a timed system that would cycle over the time determined to provide properly conditioned wastewater. This time could be determined from prior cycles, from modeling, observation, or other means.
    - Another control system that could be used would be to measure ammonia gas levels in a barn [010] or near a property line or other important area and cycle the system sufficiently that the ammonia odors remain below a preset level such as 5 ppm which is one of the thresholds for being able to smell ammonia or at 25 ppm which is the standard many swine operators try to not exceed in their barns or 15 ppm which is a newer standard being proposed or at any other level deemed as necessary or desirable.
- Small modifications to the waste lagoon [016] at location of NOMS [028] to add capacity to store NOMS effluent in a waste storage lagoon forebay [414] for use as needed as follows:
    - Addition of a curtain wall [136] in the waste lagoon [016] to segregate flow back from NOMS [028]
    - Discharge piping [419] from NOMS [028] to waste storage lagoon forebay [414] and the suction piping [415] and pumping from the forebay via the recirculation line [024] to the barns [402-412] as needed.

The modification of the waste lagoon [016], the creation of a small 'forebay' will permit retention of enough treated water for replenishment of the waste pits [012], one which requires 32,000 gallons. The forebay will have a volume in the range of 100,000 gallons (created by use of a baffle curtain [420] in the lagoon, see FIG. 4D) to permit storage of nitrified water. Conditioned water will be discharged to end of the forebay farthest from the inlet. This will also be the withdrawal point for stored treated wastewater where it can be pumped out as necessary to recharge waste pits [012] and waste troughs [014]. Influent for the NOMS [028] will be at the influent side of the forebay and conditioned water from the NOMS [028] will be used as need to provide flushwater [027] to barns and necessary with treated wastewater in excess of immediate needs discharge to the forebay. Once flow approaching the approximate 100,000 gallons of the forebay is attained the capacity of the NOMS [028] can be reduced to maintain an equilibrium approaching the 100,000 gallons of forebay storage.

Figure 4C:
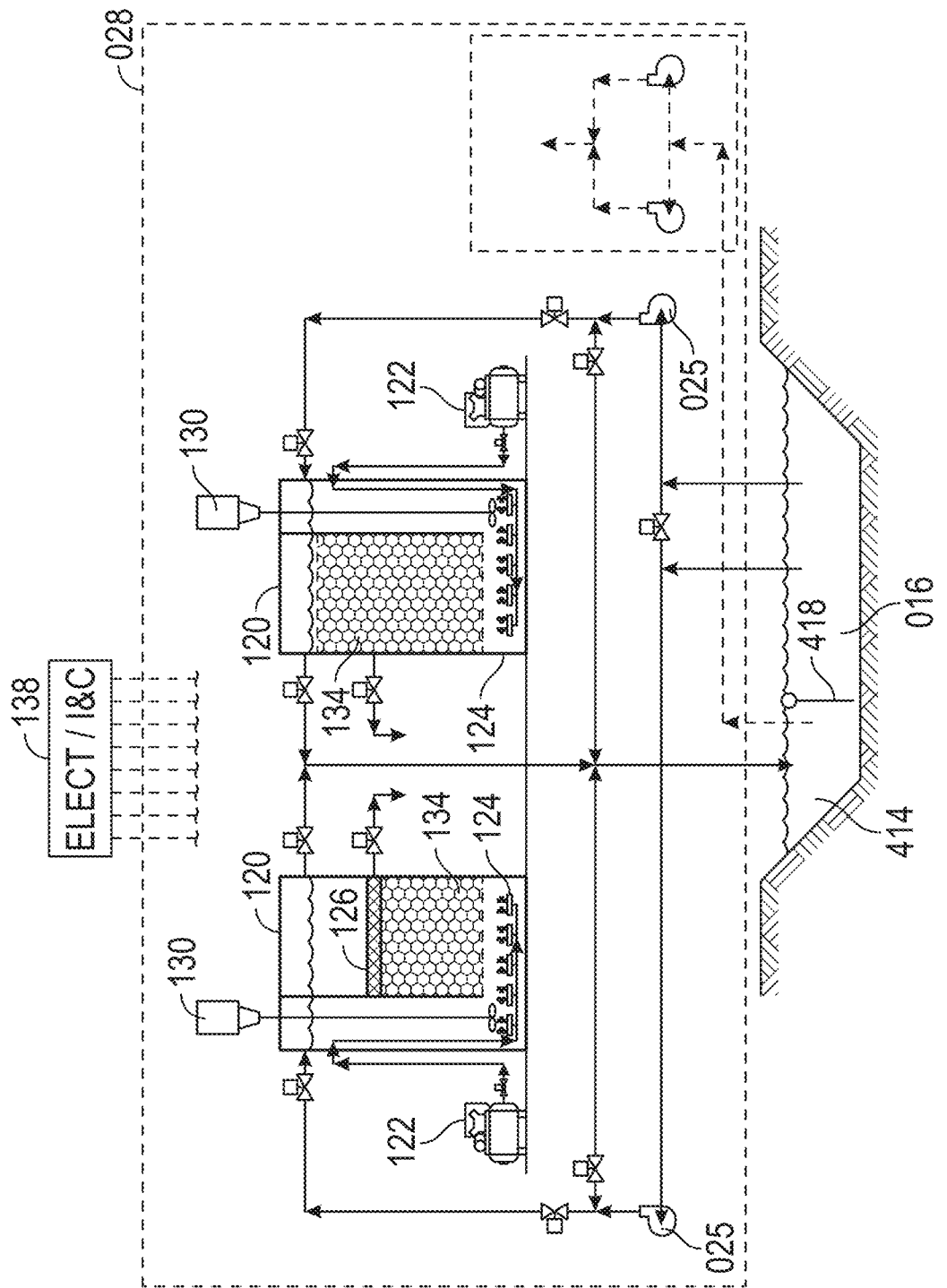
FIG. 4C provides a schematic of the NOMS reactor and lagoon forebay system.

The embodiment shown in FIGS. 4B and 4C are for a sequencing batch reactor.

An additional embodiment of the system would be a continuous flow system with a complete mix nitrification system, a plug flow system, or a combination of complete mix tanks in series or parallel.

Additionally, another embodiment nitrifies from between half and all of the ammonia in the wastewater since treating only the recycle wastewater after significant organic carbon has been removed greatly decreases the size required for this type of system. Nitrifying a substantial amount of ammonia will permit very high removal of ammonia and subsequent nitrogen removal in other parts of the wastewater system through denitrification and deammonification. Also, nitrifying half of the ammonia or more decreases the level of ammonia that can gas out by 50% or more and thus accomplishes a significant decrease in ammonia levels. Accordingly, locating the NOMS after a settling process and using the NOMS to nitrify half to all of the ammonia in the recycle wastewater is a separate embodiment of this disclosure.

Preferential Nitrite Embodiments

In one embodiment the conditions to culture ammonia oxidizing bacteria (AOBs) over nitrite oxidizing bacteria (NOBs) are used to transform ammonia preferentially to nitrite and not continue the process to formation of nitrate. This permits more efficient use of oxygen addition and promotes the deammonification process over the denitrification process. Deammonification more efficiently removes nitrogen from the system by removing a mole of ammonia for each mole of nitrite removed. Additionally, deammonification does not require organic matter which permits the organic matter to be captured downstream for biogas production.

To preferentially culture nitrite forming AOBs over nitrate forming NOBs it is desirable to heat the process to above 25° C. with a range of 27° C. to 29° C. being a good target range. Additionally, it is desirable to keep the dissolved oxygen level below 1.0 mg/l and preferentially in the range of 0.5 to 0.8 mg/l since AOBs are able to better compete for oxygen when it is at low levels. Use of the higher heat range and lower dissolved oxygen level will provide conditions for the AOBs to predominate over the NOBs. High levels of ammonia over 100 mg/l are also preferential to the growth of AOBs over NOBs and most swine wastewater used as flush water contains this level of ammonia or higher.

Additionally, the lower target dissolved oxygen levels of 0.5 to 0.8 mg/l will require approximately 10% to 20% less oxygen addition than maintaining normally the case for dissolved oxygen (DO) concentrations of more than 2 to 4 mg/l, thereby lowering costs further. Use of pure oxygen or providing air via cylinders or even by aeration is expensive. Also, the reaction of transforming ammonia to nitrite is exothermic and this will thus lower the additional heat required to make this process work. In the winter the additional heat added to the wastewater to promote this process will be transferred to the barns when the warmer effluent it used to fill the pits. This will in turn reduce heating requirements in the barns during cold weather thus promoting energy efficiency. This system may be run continuously throughout the year. However, it may be most beneficial during cold weather months. In this scenario, the heat provided during the cold weather months would more than offset the lower activity of the organisms that would otherwise be produced during cold weather. For example, in the summer if the process was operated without supplemental heat at an average temperature of 25° C. the activity of the organisms would be a hypothetical 1× whereas in cold weather at 15° C. that activity would be reduced to 0.5×. In very cold weather this could be very pronounced, and the activity could drop to 0.25× or less. The lower tankage requirements for a heated system lowers capital costs significantly and also permits a smaller system to be installed which in turn permit quicker installation and allows for manufacture of a prefabricated system easier to transport by truck and provide a turnkey installation. Control of the system could be by any method provided herein and these modes should be modified for target temperature and/or dissolved oxygen levels as required.

FIG. 4A: In-Lagoon System Embodiment

Another embodiment of the present disclosure includes a system that could be installed in a lagoon, as shown in FIG. 4A. The lagoon could have a partition in it whereby it is divided into two or more parts. If the lagoon is divided into two parts, the first part A [422] (covered) and end part B [423] (channels), then an NOMS [028] could be placed in a middle section, Part C [424] (open area), to receive flow from Part A [422] as it exits and pass through Part C [424] into Part B [423] as shown in FIG. 4A. The isometric of the system would be installed in front of one or more of the lagoon baffle openings [421]. It may be desirable to cover one section of the lagoon with a lagoon cover [417] to permit generation of biogas. This would generally be the first part of the system, part A [422]. This section could be small or large and would be sized to cover the desired amount of settled solids for biogas generation. The section might be made more compact by dredging or otherwise relocating settled solids from other parts of the lagoon (or from a nearby lagoon). Installation of the NOMS [028] would permit treatment of lagoon wastewater exiting part A [422] and thus lower ammonia odors in part B [423]. This would lower the cost of covering the lagoon since the entire lagoon would not require a cover [417] to eliminate odors from the lagoon. Installing the NOMS [028] before part B [423] would also permit part B [423] to operate aerobically and with reduced ammonia levels. This would permit increased use for aquaculture and other beneficial options. Part C [424] consists of a NOMS [028] to biologically lower the pH of wastewater by nitrification. Part C [424] could also have baffle curtains [420] and route flow from one or more NOMSs through a channel made by the baffle curtains [420] and additional treatment including nitrification, denitrification, deammonification, and other beneficial biochemical processes may occur. Furthermore, the NOMS may be modular so that a number of them may be joined together to provide the desired level of treatment.

Figure 4D:
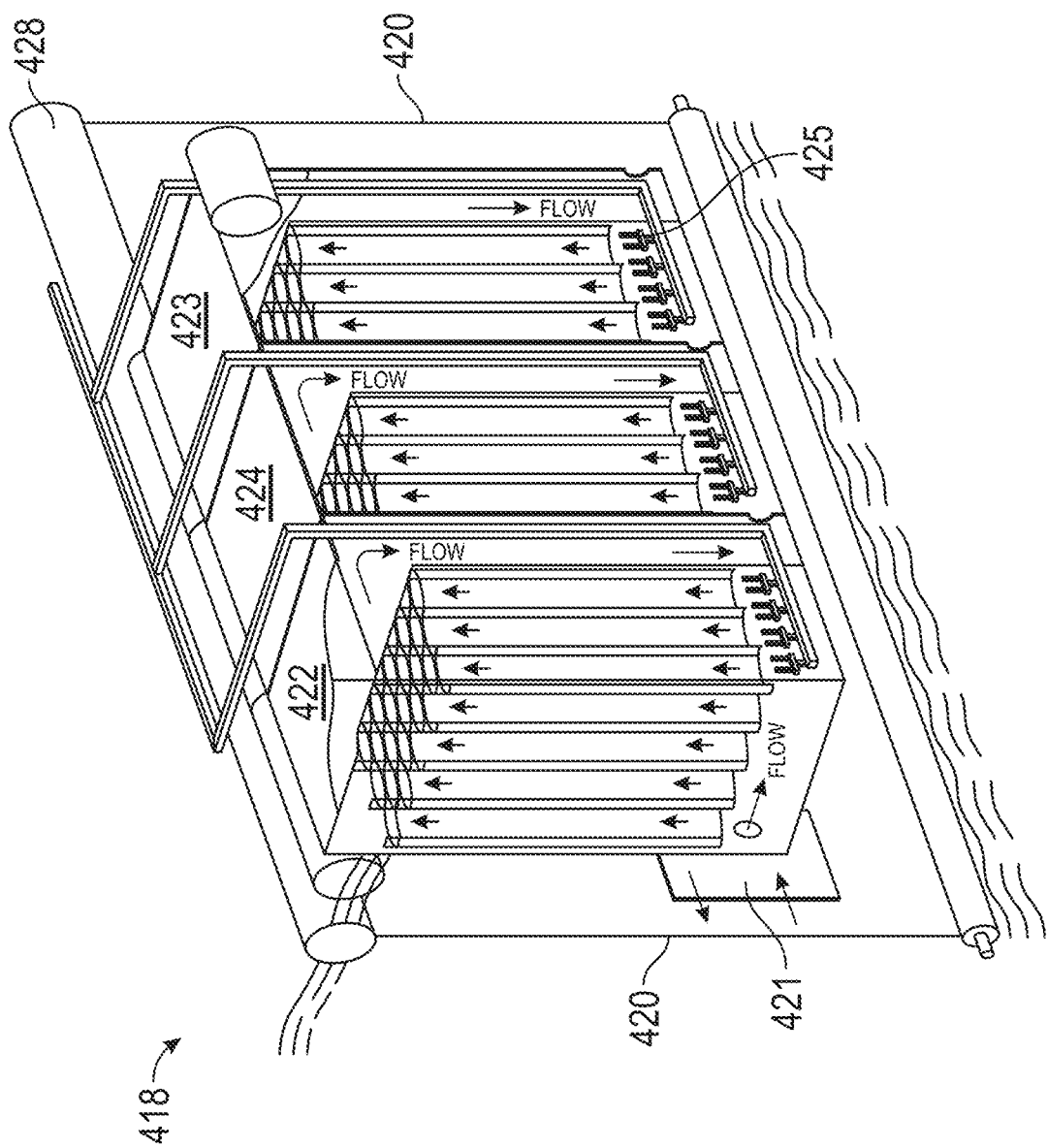
FIG. 4D illustrates the curtain baffle system of the waste lagoon.

FIG. 4D illustrates a modular NOMS [028] wherein three modules have been joined together with the second receiving the flow from the first and the third module receiving flow from the second. The NOMS takes effluent from Part A [422] as it exits from an opening, baffle curtain window [421] in the baffle wall [418] separating Part A [422] from Part C [424]. Flow from the baffle wall [418] can exit Part A [422] by displacement (i.e. new wastewater flushing into Part A [422] and displacing existing wastewater. It can also be drawn from Part A [422] by suction from Part C [424] generated by the NOMS [028]. The NOMS [028] would be neutrally buoyant and float at the surface by a baffle curtain float assembly [428] which would also support the lagoon baffle wall [418]. Air would be added through a grid of coarse bubble air diffuser aerator disks [425] at the bottom of the NOMS [028] module that would provide air for oxygen and would also act as an air pump so that the air/water mixture would rise and the water would cascade over an opening at the top of the module and enter the next module. The NOMS [028] module would have media that would support the growth of microorganisms such as nitrifiers. Air could be supplied by an air blower or compressor at the module or by a landside compressor and carried by an airline to the NOMS [028].

The highly nitrified wastewater is removed from the end of Part C [424] and used as flush water for the swine barns [010, 402-412]. Alternately, Part C [424] may include sections that are anoxic or anaerobic and denitrification and deammonification would occur to lower the overall level of nitrogen in the system. This denitrification and deammonification may also occur in Part B [423] of the lagoon and the effluent from the lagoon may be used to flush the barns. The result is that this effluent would have less nitrite and nitrate than the effluent from Part C [424] but it would have a lower pH. The lower pH would make it suitable for use as flush water to depress ammonia gas emissions.

An alternate embodiment of this disclosure would locate the NOMS [028] under a cover [417], its own or even inside Part A [422] or other covered part of the lagoon. The NOMS [028] in the covered area would benefit from more steady temperature and could enjoy heat generated inside the covered area. An additional embodiment could use a heat pump to draw heat from the wastewater or air and use it to heat the wastewater passing through the NOMS [028] or to heat the media itself.

The NOMS [028] can also provide nitrified wastewater to flush the drain lines from the pits [012] to the lagoon [016]. The flush water added at a location where the pipeline leaves the barns and flushes through to the lagoons will keep struvite and other precipitants from clogging the lines.

This system can also be used for other types of waste collection systems, and the nitrified and/or acidified wastewater can be used to flush lines that carry waste. Again, while this system is described for swine waste management, it can be implemented by one skilled in the art to provide struvite control for other animal husbandry systems such as dairy, cattle, sheep, etc. The system described could also be implemented for municipal systems that have struvite precipitation issues.

Figure 5:
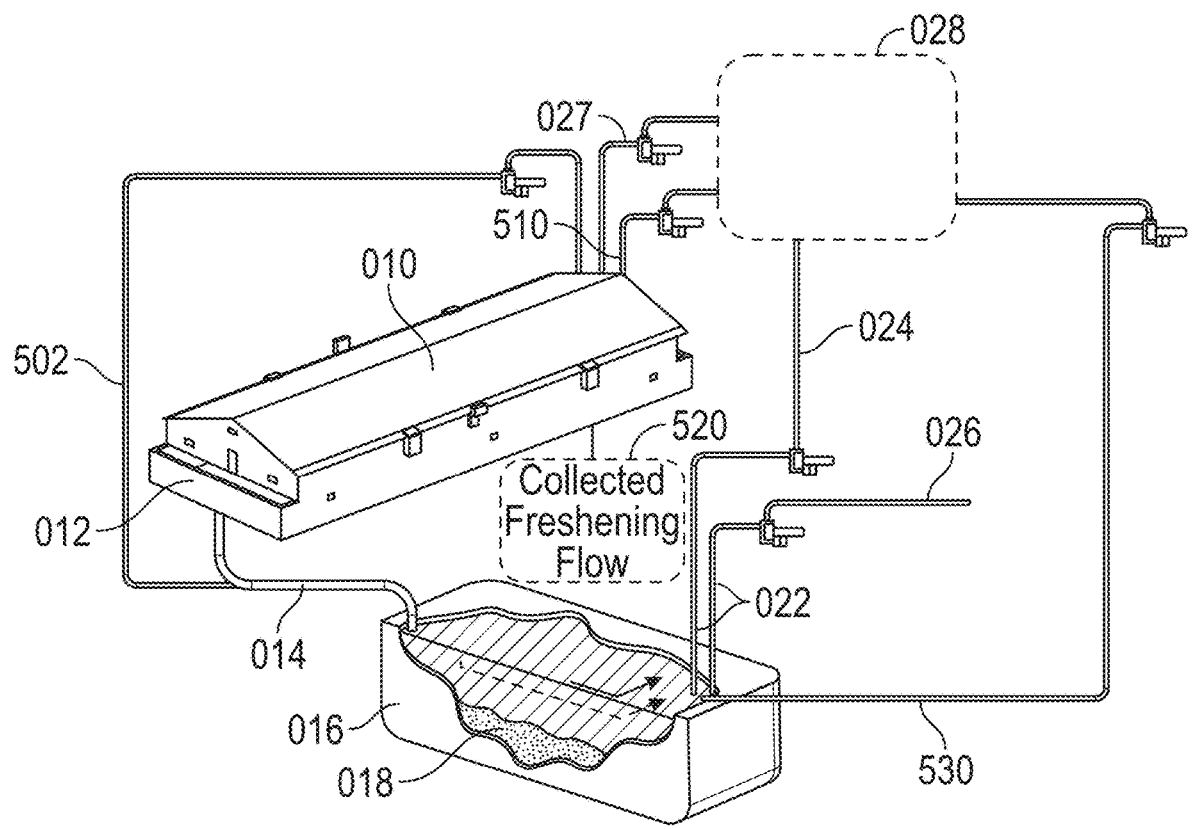
FIG. 5 Swine System with NOMS Schematic Showing Flushing, Freshening, and Seeding Flow from the NOMS.

FIG. 5: Swine System with NOMS Schematic Showing Pipe Flushing, Freshening, and Seeding Flow The disclosed innovation may have several additional embodiments as shown on FIG. 5.

In one additional embodiment, flush water [027] from the NOMS [028] may be used to directly flush drain lines [502] and other structures which may have precipitate buildup. This will flush solids that may remain and form precipitate. Also, the flushing water [027] will lower the pH and make it more difficult for struvite and other precipitates to form.

In an additional embodiment flushing water from the NOMS [028] may be added in low amounts of 1% to 50% of the normal flushing flow to serve as a freshening flow [510] that can either be routed to the lagoon [016] or to a special freshening (or sweetening, SW) flow storage tank [520] for separate processing.

In an additional embodiment some of the nitrifiers could be routed to the lagoon [016] to serve as seeding organisms [530] to improve nitrification in the lagoon.

Embodiments Using Different Operational Modes

The NOMS [028] can be operated in a number of modes that utilize one or more measured values (parameters) to ensure effective and successful wastewater treatment including one or more selected from the following; dissolved oxygen (DO) level, pH, Oxidation Reduction Potential (ORP), alkalinity, ammonia off gas level, temperature, hydraulic retention time (HRT), solids retention time (SRT), modeling, and visual inspection.

Control of the NOMS Reactors

The discussion of operation focuses on a NOMS that consists of two batch reactors [120] (as shown in FIGS. 4B and 4C) that nitrify to the desired level, settle the solids from the supernatant which will be used for flushing directly or which can be stored in a storage tank or area such as a waste storage lagoon forebay [414]. This type of system has the advantage of ease of operation and redundancy and is also relatively easy to prefabricate. A continuous flow system is an alternate embodiment of this disclosure.

This disclosure discusses operational control of the nitrification process as one control system and when to apply flush water [027] as a second control system. These may be separated by use of a separate storage tanks for flush water or by multiple reactors that act as temporary storage once they reach the desired level of nitrification. These two operational systems may be combined if the flush water generated by the nitrification reactors is flushed to a barn whenever the flush water has been conditioned appropriately.

In one embodiment of the NOMS [027] there are nitrification tanks that operate as batch reactors and can be operated to maintain a set DO level which may vary depending on what set of nitrifying organisms are desired (low DO level will tend to select for AOBs) or the DO may be set to maintain a certain level to ensure adequate oxygen is always present. A DO of 2 mg/l is generally considered adequate to provide excess oxygen. However, some practitioners set this level at 4 mg/l or above to ensure that oxygen does not limit the nitrification process. A DO of less than 1 mg/l will preferentially select for AOBs and a level between 0.5 and 0.8 is often set to preferentially culture AOBs.

Measuring pH, ORP, alkalinity, or ammonia off gas level in the nitrification system can serve as a surrogate DO measurement and can also be used to control the nitrification process to maintain it at the desired level.

Measuring pH is an embodiment that can be used to control the correct level of nitrification and is discussed elsewhere in this disclosure. To operate the nitrification system using pH, air would be added to keep the pH on a downward trend until the desired pH is reached at which point the ORP is a parameter that averages the oxidation and reduction potential of all elements in a mixture. Negative ORPs are indicative of reducing environments and are not conducive to nitrification. ORP levels in the range of 100 to 400 my indicate that there is enough oxidative potential for nitrification of ammonia. ORP levels can vary with particular constituents in the wastewater but can be used as a measurement once the target level of ORP is reached for a particular flow. Thus the operator could monitor the pH of a NOMS system along with ORP and determine the ORP that corresponds to the desired pH as use that level as a target. ORP measurement is more robust and the probes tend to me more rugged, therefore, using ORP as a measurement for day to day operations may be preferable to pH.

Alkalinity level can also be used to control the reactors though its measurement is more difficult that pH or ORP. Alkalinity is measure in mg/l as $CaCO_3$ and measurement of low alkalinity, generally less than 100 mg/l in swine wastewater, would also be a way to control the process.

Ammonia off gas measurement is a novel embodiment of control of the nitrification system since it is a parameter of concern for odor control but has never been used to control nitrification in any process. An ammonia sensor can be used on the exhaust vent of the reactors and set at the desired level to indicate when the flush water has been appropriately conditioned Temperature can be used to control the reaction, especially to maintain the temperature high enough to maintain nitrification, generally above 15° C., or to maintain it at a high level to preferentially select for AOBs, generally 25° C. to 30° C.

Hydraulic retention time (HRT), can be used to control the process once a target HRT is established for a particular wastewater based on testing or modeling.

Solids retention time (SRT), can be used to control the process once a target HRT is established for a particular wastewater based on testing or modeling.

Modeling, can be used to control the process if a model has been constructed based on theoretical or actual nitrification kinetics and the influent characteristics are measured and used in the model or if they are sufficiently estimated.

Visual inspection of the system can be used if there is an operator with experience who can determine when a process is operating correctly and this may be supplemented with settling tests, microscopic examination, etc.

Control of when to Flush with Conditioned Wastewater

Control of flushing may be accomplished by pH, Oxidation Reduction Potential (ORP), ammonia off gas level, timed flushing, modeling, and visual and olfactory inspection.

A flush cycle could be started by use of pH monitoring. The pH could be monitored at a location or locations in pits or other structures so that a flush cycle is initiated whenever pH reached a set level A flush cycle could be started by use of Oxidation Reduction Potential (ORP) monitoring. The pH could be monitored at a location or locations in pits or other structures so that a flush cycle is initiated whenever ORP reached a set level.

A flush cycle could be started by use of ammonia off gas level monitoring. The ammonia off gas level could be monitored at a location or locations in pits or other structures or at vents or at a set point such as the property so that a flush cycle is initiated whenever ammonia gas reached a set level.

A flush cycle could be started by use of timed flushing whereby the flush cycle is initiated whenever set time is reached.

A flush cycle could be started by use of modeling. The model would estimate when flushing is necessary so that a flush cycle is initiated when the model indicates significant ammonia off gassing.

A flush cycle could be started by visual and olfactory inspection. Flushing would occur when it appears necessary by visual inspection or because ammonia off gassing is smelled.

I claim:

1. A method comprising:
  receiving wastewater in a lagoon, wherein the sum of the concentration of ammonia and the concentration of ammonium in the wastewater is at least 50 mg/l lagoon; and nitrifying the received wastewater from the lagoon by using nitrifying bacteria to generate a treated wastewater; and introducing the treated wastewater to a barn to flush animal waste from the barn, wherein the treated wastewater has a lower pH than the received wastewater and the pH of the treated wastewater is lowered to a pH of 7.7 or lower, wherein ammonia gas emissions are suppressed from off gassing in the treated wastewater based on the lowered pH of the treated wastewater, and wherein the atmospheric ammonia level in the barn after using the treated wastewater to flush the barn is 25 ppm or less.

2. The method of claim 1, wherein the received wastewater in the lagoon has a preliminary settling of solids; and wherein only a fraction of ammonia and ammonium in the received wastewater is suppressed in the treated wastewater.

3. A method comprising:

receiving wastewater, wherein the sum of the concentration of ammonia and the concentration of ammonium in the wastewater is at least 50 mg/l;

nitrifying the received wastewater by using nitrifying bacteria to generate a treated wastewater;

receiving the treated wastewater at a barn; and adding the treated wastewater to the barn to suppress odors, remove nitrogen, and improve swine productivity in the barn;

wherein the treated wastewater has a lower pH than the received wastewater and has a pH of 7.7 or lower;

wherein adding the treated wastewater to the barn suppresses ammonia gas emissions based on the lowered pH of the treated wastewater; and wherein adding the treated wastewater to the barn causes denitrification in the barn.

4. The method of claim 3, wherein the ammonia gas emissions are suppressed from off gassing from the treated wastewater by 50%.

5. The method of claim 3, wherein the ammonia gas emissions are suppressed from off gassing from the treated wastewater by 90%.

6. The method of claim 3, wherein nitrifying the received wastewater to generate the treated wastewater comprises converting ammonia and ammonium in the received wastewater to produce nitrite and nitrate.

7. The method of claim 6, wherein nitrifying the received wastewater to generate the treated wastewater comprises consuming alkalinity in the received wastewater to lower the pH of the treated wastewater to the target level of a pH of 7.7 or lower.

8. The method of claim 7, wherein nitrifying the received wastewater to generate the treated wastewater comprises sequestering ammonia in the received wastewater.

9. The method of claim 6, wherein the produced nitrite and nitrate reduce the ammonia emissions from the received wastewater.

10. The method of claim 3, wherein receiving the treated wastewater at a barn flushes animal waste from the barn.

11. The method of claim 3, wherein the atmospheric ammonia level in the barn after adding the treated wastewater is 25 ppm or less.

12. The method of claim 3, wherein the nitrifying of the received wastewater transforms at least 50 percent of the sum of ammonia and ammonium in the received wastewater to at least one of nitrite and nitrate in the treated wastewater, and the pH of the treated wastewater is at least 0.3 units less than the pH of the received wastewater.

* * * * *